US012671905B2

(12) United States Patent
    Hamner

(10) Patent No.: US 12,671,905 B2
(45) Date of Patent: Jun. 30, 2026

(54) LIGHTING CONFIGURATION FOR METROLOGY SYSTEM WITH IMAGES ACQUIRED AT DIFFERENT FOCUS POSITIONS

(71) Applicant: Mitutoyo Corporation, Kanagawa-ken (JP)

(72) Inventor: Christopher Richard Hamner, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 826 days.

(21) Appl. No.: 17/850,485

(22) Filed: Jun. 27, 2022

(65) Prior Publication Data
    US 2023/0421909 A1     Dec. 28, 2023

(51) Int. Cl.
    *G06K 9/00*        (2022.01)
    *G06T 7/00*        (2017.01)
        (Continued)

(52) U.S. Cl.
    CPC ........... *H04N 23/72* (2023.01); *G06T 7/0004* (2013.01); *G06T 7/80* (2017.01); *G06T 2207/30164* (2013.01)

(58) Field of Classification Search
    CPC ..... G01N 21/8806; G06T 7/80; G06T 7/0004; G06T 2207/30164; G01B 11/24; G02B 7/08; G02B 21/244
    See application file for complete search history.

(56) References Cited

U.S. PATENT DOCUMENTS 1,840,448 A     1/1932  Heine
4,567,551 A     1/1986  Choate
        (Continued)

FOREIGN PATENT DOCUMENTS

EP        2 602 649 A1    6/2013
JP       2003-315678 A    11/2003
        (Continued)

OTHER PUBLICATIONS

Dross et al., "Illumination Optics: Köhler integration optics improve illumination homogeneity," URL: https://www.laserfocusworld.com/optics/article/16551351/illumination-optics-khler-integration-optics-improve-illumination-homogeneity, 8 pages.
        (Continued)

*Primary Examiner* — Avinash Yentrapati
(74) *Attorney, Agent, or Firm* — Seed Intellectual Property Law Group LLP

(57)        ABSTRACT
A lighting configuration is provided for utilization with a metrology system. The metrology system includes a camera that provides images of a workpiece at different focus positions (e.g., through operation of a variable focal length lens). The lighting configuration includes a plurality of lighting portions which illuminate the workpiece for the imaging. The lighting portions are distributed in an arrangement (e.g., an annular arrangement) in which an imaging lens portion of each lighting portion directs light toward a central volume (e.g., for which illumination in the central volume may be relatively uniform in X, Y and Z axis directions). Each imaging lens portion may include at least two lenses in a telecentric arrangement. Each lighting portion may comprise an optical homogenizer. The camera acquires a stack of images of the workpiece, from which focus curve data may be determined which indicates 3 dimensional positions of surface points on the workpiece.

24 Claims, 13 Drawing Sheets

(51) Int. Cl.
G06T 7/80 (2017.01)
H04N 23/72 (2023.01)

(56) References Cited

U.S. PATENT DOCUMENTS

| | | | |
|---|---|---|---|
| 5,038,258 A | 8/1991 | Koch et al. | |
| 5,461,417 A | 10/1995 | White et al. | |
| 5,684,530 A | 11/1997 | White | |
| 5,690,417 A | 11/1997 | Polidor et al. | |
| 6,027,237 A * | 2/2000 | Riser | G02B 6/4298 |
| | | | 362/373 |
| 6,179,439 B1 | 1/2001 | Choate | |
| 6,273,338 B1 | 8/2001 | White | |
| 6,454,437 B1 | 9/2002 | Kelly | |
| 6,542,180 B1 | 4/2003 | Wasserman et al. | |
| 6,857,762 B2 | 2/2005 | Shimokawa et al. | |
| 7,030,351 B2 | 4/2006 | Wasserman et al. | |
| 7,113,684 B1 | 9/2006 | Cianciotto et al. | |
| 7,127,159 B2 | 10/2006 | Gladnick et al. | |
| 7,171,097 B2 | 1/2007 | Cianciotto et al. | |
| 7,173,775 B2 | 2/2007 | Cianciotto et al. | |
| 7,324,682 B2 | 1/2008 | Wasserman | |
| 7,454,053 B2 * | 11/2008 | Bryll | G06V 10/945 |
| | | | 382/152 |
| 7,460,703 B2 * | 12/2008 | Chang | H04N 7/18 |
| | | | 382/152 |
| 7,564,623 B2 | 7/2009 | Vodyanoy et al. | |
| 7,570,795 B2 | 8/2009 | Yu et al. | |
| 7,627,162 B2 | 12/2009 | Blanford et al. | |
| 8,085,295 B2 | 12/2011 | Tobiason et al. | |
| 8,111,905 B2 * | 2/2012 | Campbell | G01N 21/8806 |
| | | | 382/152 |
| 8,111,938 B2 | 2/2012 | Bryll et al. | |
| 8,194,307 B2 | 6/2012 | Arnold et al. | |
| 8,548,268 B2 * | 10/2013 | Della Vedova | G01P 3/806 |
| | | | 382/280 |
| 8,581,162 B2 | 11/2013 | Campbell | |
| 8,926,152 B2 | 1/2015 | Burges | |
| 9,060,117 B2 | 6/2015 | Bryll et al. | |
| 9,143,674 B2 | 9/2015 | Gladnick | |
| 9,213,175 B2 | 12/2015 | Arnold | |
| 9,256,009 B2 | 2/2016 | Theriault et al. | |
| 9,726,876 B2 | 8/2017 | Bryll | |
| 9,736,355 B1 | 8/2017 | Bryll | |
| 9,774,765 B2 | 9/2017 | Bryll et al. | |
| 9,830,694 B2 | 11/2017 | Bryll | |
| 9,930,243 B2 | 3/2018 | Gladnick et al. | |
| 9,983,459 B2 | 5/2018 | Arnold | |
| 10,007,101 B2 | 6/2018 | Prantl et al. | |
| 10,101,572 B2 | 10/2018 | Bryll et al. | |
| 10,151,962 B2 | 12/2018 | Gladnick et al. | |
| 10,171,725 B1 * | 1/2019 | Nahum | G03B 13/36 |
| 10,178,321 B2 | 1/2019 | Emtman et al. | |
| 10,281,700 B1 * | 5/2019 | Nahum | H04N 23/67 |
| 10,520,650 B2 | 12/2019 | Freerksen et al. | |
| 10,578,827 B2 | 3/2020 | Cook | |
| 10,809,378 B1 | 10/2020 | Gladnick et al. | |
| 10,880,468 B1 | 12/2020 | Bryll | |
| 11,119,214 B2 | 9/2021 | Tobiason et al. | |
| 11,125,967 B2 | 9/2021 | Gladnick et al. | |
| 2003/0156409 A1 | 8/2003 | Choate et al. | |

| | | | |
|---|---|---|---|
| 2004/0165759 A1 * | 8/2004 | Baldwin | G01N 21/8806 |
| | | | 348/125 |
| 2005/0135766 A1 | 6/2005 | Cianciotto et al. | |
| 2005/0213807 A1 * | 9/2005 | Wasserman | G06T 7/0004 |
| | | | 382/152 |
| 2006/0002605 A1 * | 1/2006 | Chang | G01N 21/952 |
| | | | 382/141 |
| 2006/0093205 A1 * | 5/2006 | Bryll | G06V 10/457 |
| | | | 382/152 |
| 2006/0211802 A1 | 9/2006 | Asgari | |
| 2007/0046898 A1 * | 3/2007 | Conner | H04N 9/3155 |
| | | | 353/31 |
| 2007/0242924 A1 | 10/2007 | Cianciotto et al. | |
| 2007/0263298 A1 | 11/2007 | El-Ghoroury et al. | |
| 2008/0123196 A1 | 5/2008 | Cianciotto | |
| 2009/0046923 A1 * | 2/2009 | Chang | H04N 7/18 |
| | | | 382/152 |
| 2009/0180679 A1 * | 7/2009 | Hackney | H10P 95/00 |
| | | | 382/141 |
| 2010/0078576 A1 * | 4/2010 | Ntziachristos | G01N 21/6428 |
| | | | 382/128 |
| 2010/0137990 A1 | 6/2010 | Apatsidis et al. | |
| 2010/0309307 A1 * | 12/2010 | Jin | G01N 21/952 |
| | | | 382/141 |
| 2011/0116704 A1 * | 5/2011 | Zoeller, III | G01N 21/95692 |
| | | | 382/141 |
| 2012/0026386 A1 | 2/2012 | Tomita | |
| 2014/0368726 A1 * | 12/2014 | Gladnick | G01B 11/24 |
| | | | 348/349 |
| 2016/0025903 A1 | 1/2016 | Arnold | |
| 2017/0052425 A1 | 2/2017 | Arnold | |
| 2017/0078549 A1 | 3/2017 | Emtman et al. | |
| 2017/0111986 A1 * | 4/2017 | Kim | H05G 2/00 |
| 2017/0324895 A1 * | 11/2017 | Bryll | H04N 23/62 |
| 2018/0143419 A1 | 5/2018 | Bryll et al. | |
| 2018/0180773 A1 | 6/2018 | Usami et al. | |
| 2018/0275390 A1 * | 9/2018 | Harsila | G02B 21/245 |
| 2019/0369300 A1 | 12/2019 | Freerksen et al. | |
| 2020/0209519 A1 * | 7/2020 | Gladnick | H04N 17/002 |
| 2021/0164768 A1 * | 6/2021 | Yamanaka | H04N 23/673 |
| 2023/0222646 A1 * | 7/2023 | Anderson | G01N 21/9515 |
| | | | 382/141 |

FOREIGN PATENT DOCUMENTS

| | | | | |
|---|---|---|---|---|
| JP | 2005-158490 A | 6/2005 | | |
| JP | 5906849 B2 | 4/2016 | | |
| WO | WO-9922224 A1 * | 5/1999 | | G01N 21/8806 |

OTHER PUBLICATIONS

Edmund Optics Worldwide, "Imaging Resource Guide, Section 11.4, Telecentric Illumination," 7 pages.

Mermillod-Blondin et al., "High-speed varifocal imaging with a tunable acoustic gradient index of refraction lens," Department of Mechanical and Aerospace Engineering, Princeton University, Optics Letters, vol. 33(18), Princeton, New Jersey, Sep. 15, 2008, 3 pages.

Mitutoyo Corporation & Micro Encoder Inc. "QVPAK® 3D CNC Vision Measuring Machine User's Guide," Version 7, 2003, 329 pages.

Wikipedia, "Telecentric lens," https://en.wikipedia.org/w/index.php?title=Telecentric_lens&oldid=1063609064, 4 pages.

* cited by examiner

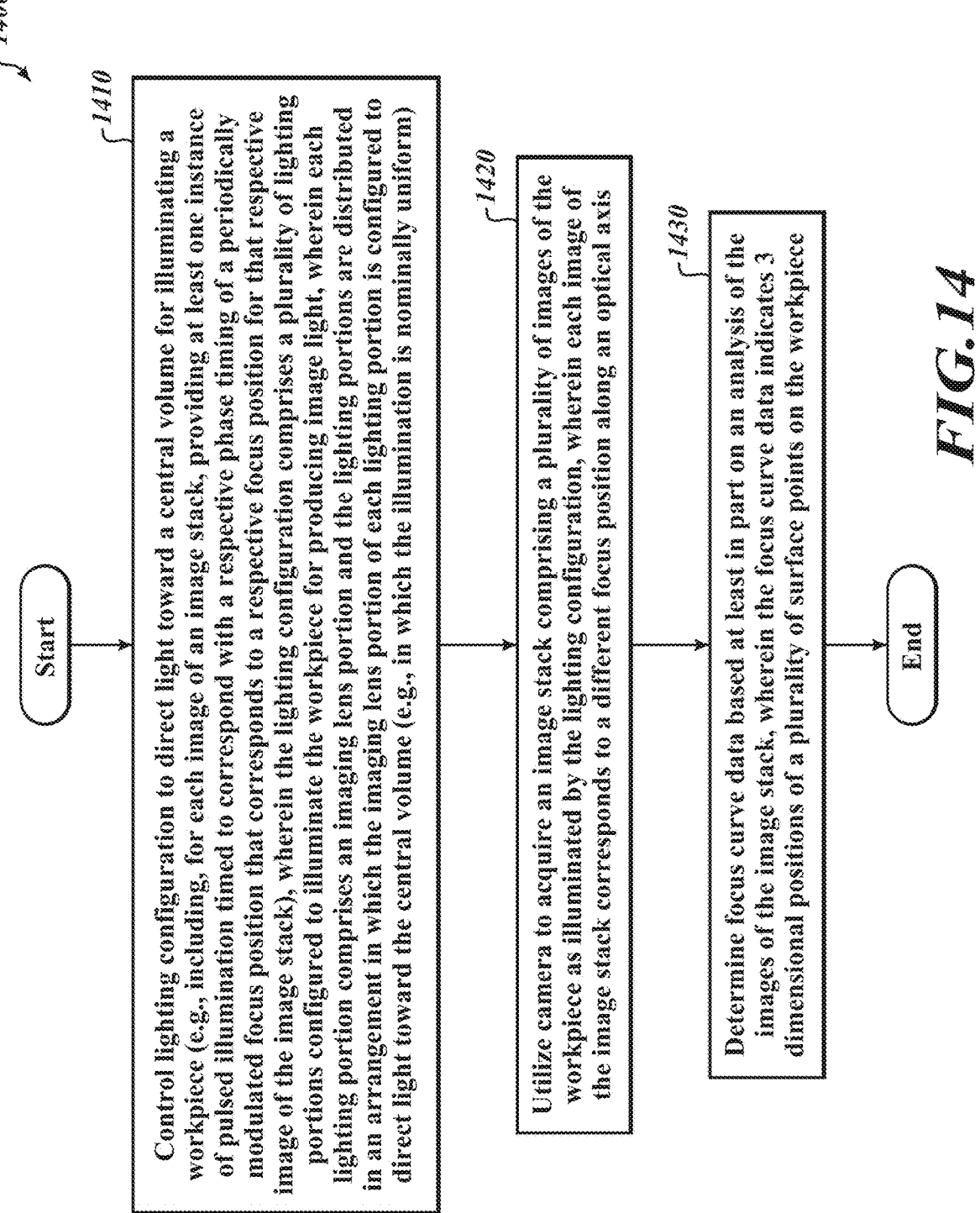

1400

1410

Control lighting configuration to direct light toward a central volume for illuminating a workpiece (e.g., including, for each image of an image stack, providing at least one instance of pulsed illumination timed to correspond with a respective phase timing of a periodically modulated focus position that corresponds to a respective focus position for that respective image of the image stack), wherein the lighting configuration comprises a plurality of lighting portions configured to illuminate the workpiece for producing image light, wherein each lighting portion comprises an imaging lens portion and the lighting portions are distributed in an arrangement in which the imaging lens portion of each lighting portion is configured to direct light toward the central volume (e.g., in which the illumination is nominally uniform)

1420

Utilize camera to acquire an image stack comprising a plurality of images of the workpiece as illuminated by the lighting configuration, wherein each image of the image stack corresponds to a different focus position along an optical axis

1430

Determine focus curve data based at least in part on an analysis of the images of the image stack, wherein the focus curve data indicates 3 dimensional positions of a plurality of surface points on the workpiece Start End

*FIG.14*

LIGHTING CONFIGURATION FOR METROLOGY SYSTEM WITH IMAGES ACQUIRED AT DIFFERENT FOCUS POSITIONS

BACKGROUND

Technical Field

This disclosure relates to precision metrology, and more particularly to metrology systems with lighting configurations for illuminating workpieces for which images may be acquired at different focus positions.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope type optical system and moves the stage to provide inspection images of workpieces.

Various types of lighting configurations may be utilized for illuminating a workpiece for imaging. For example, certain systems may utilize a coaxial light source, a stage light source or a ring light source for illuminating certain types of workpieces. For some types of applications (e.g., acquiring images of non-planar workpiece surfaces at different focus positions), such light sources may have certain limitations (e.g., as limited in the intensity and/or efficiency of the illumination that can be provided, a uniformity of the provided illumination, etc.) A system that can provide improvements with regard to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided that includes an objective lens, a camera, a lighting configuration, one or more processors and a memory. The objective lens has an optical axis and is configured to input image light arising from a workpiece, and to transmit the image light along an imaging optical path. The camera is configured to receive image light transmitted along the imaging optical path and to provide images of the workpiece. A focus position that corresponds to the focus of the images is configured to be variable within a focus range along the optical axis. The lighting configuration comprises a plurality of lighting portions configured to illuminate the workpiece for producing the image light, wherein each lighting portion comprises an imaging lens portion and the lighting portions are distributed in an arrangement in which the imaging lens portion of each lighting portion is configured to direct light toward a central volume. The one or more processors are coupled to the memory. The memory stores program instructions that when executed by the one or more processors cause the one or more processors to at least: control the lighting configuration to direct light toward the central volume for illuminating the workpiece; and utilize the camera to acquire an image stack comprising a plurality of images of the workpiece, wherein each image of the image stack corresponds to a different focus position along the optical axis (e.g., corresponding to a different Z-height). Focus curve data may be determined based at least in part on an analysis of the images of the image stack, for which the focus curve data indicates 3 dimensional positions of a plurality of surface points on the workpiece.

In another aspect, a method for operating a metrology system is provided. The metrology system includes an objective lens, a camera, and a lighting configuration. The lighting configuration comprises a plurality of lighting portions. The method comprises: controlling the lighting configuration including the plurality of lighting portions to direct light toward a central volume for illuminating the workpiece, wherein each lighting portion comprises an imaging lens portion and the lighting portions are distributed in an arrangement in which the imaging lens portion of each lighting portion is configured to direct light toward the central volume; and utilizing the camera to acquire an image stack comprising a plurality of images of the workpiece, wherein each image of the image stack corresponds to a different focus position along the optical axis. In various implementations, focus curve data may be determined based at least in part on an analysis of the images of the image stack. The focus curve data may indicate 3 dimensional positions of a plurality of surface points on the workpiece.

In another aspect, a lighting configuration for utilization in a metrology system is provided. The metrology system includes an objective lens and a camera. The lighting configuration comprises a plurality of lighting portions configured to illuminate the workpiece for producing image light. Each lighting portion comprises an imaging lens portion and the lighting portions are distributed in an arrangement in which the imaging lens portion of each lighting portion is configured to direct light toward a central volume. The lighting configuration is controlled to direct light toward the central volume for illuminating the workpiece. The camera is utilized to acquire an image stack comprising a plurality of images of the workpiece. Each image of the image stack corresponds to a different focus position along the optical axis. Focus curve data may be determined based at least in part on an analysis of the images of the image stack. The focus curve data may indicate 3 dimensional positions of a plurality of surface points on the workpiece.

BRIEF DESCRIPTION OF THE SEVERAL VIEWS OF THE DRAWINGS

FIG. 14 is a flow diagram illustrating one exemplary implementation of a routine for operating a metrology system.

DETAILED DESCRIPTION

Figure 1:
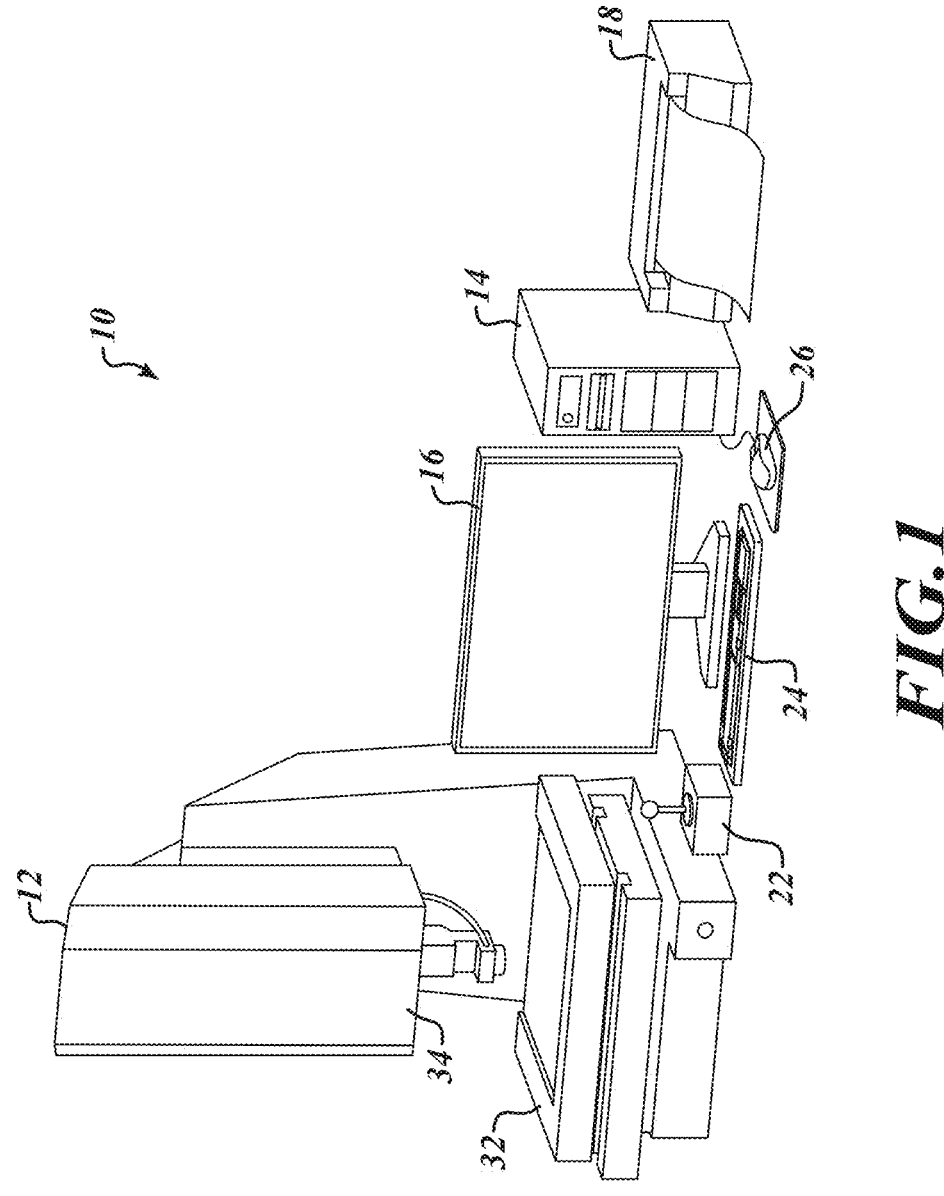
FIG. 1 is a diagram showing various typical components of a general-purpose precision machine vision metrology system.

FIG. 1 is a diagram showing various typical components of a general-purpose precision machine vision metrology system 10. The machine vision metrology system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision metrology system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of a machine vision metrology system 10 are also described in commonly assigned U.S. Pat. Nos. 7,454,053; 7,324,682; 8,111,905; and 8,111,938, each of which is hereby incorporated herein by reference in its entirety.

As will be described in more detail below, for various applications (e.g., including in which a variable focal length (VFL) lens, such as a tunable acoustic gradient (TAG) lens, is utilized), it may be desirable to provide illumination from multiple directions, such as in order to better enable the imaging of non-planar workpieces (e.g., workpieces including at least some surfaces that are not orthogonal to an optical axis of the system, such as surfaces that may be angled/sloped and/or parallel, etc. in relation to the optical axis). As will be described in more detail below with respect to FIGS. 2 and 3, a lighting configuration (e.g., lighting configuration 230, 330, etc.) as disclosed herein may include lighting portions which provide such illumination from multiple directions (e.g., as may function as an alternative to a conventional ring light, etc.)

In accordance with the principles disclosed herein, the source light as provided through the lighting portions is made to be uniform, including being imaged onto a workpiece or otherwise into a central volume so as to make a relatively uniform and dense illumination spot. It will be appreciated that in other alternative types of systems, typical ring light illumination (e.g., which may typically use a large diverging beam incident on a workpiece) may in some instances be sufficient in part due to longer available integration times for images. For example, in some systems integration/exposure time may be relatively long (e.g., tens of milliseconds), for which the typical ring illumination may be sufficient. However as in systems such as those disclosed herein (e.g., as illustrated in FIGS. 2-14) much shorter integration times may be required (e.g., utilizing one or more 100 nanosecond light pulses), which if utilizing typical ring illumination would result in a much smaller integrated power. In further regard to such issues, the typical ring illumination may have inefficiencies in that a very broad illumination spot is formed. As an example with certain specific numerical values, in certain applications, a typical ring illumination may form an illumination spot with a 5 cm diameter, even when the field of view may be significantly smaller (e.g., 5 mm×5 mm). In such instances, the typical ring illumination may be relatively inefficient in that it is more desirable to primarily direct the illumination to the field of view utilized for the imaging (e.g., to the 5 mm×5 mm area in this example), as may be achieved in accordance with the configurations as disclosed herein.

In various implementations, a lighting configuration as disclosed herein functions with relatively high efficiency and a desired level of uniformity of the illumination (e.g., in X and Y axis directions, as well as a Z axis direction, such as throughout a central volume CV). As will be described in more detail below, various aspects may contribute to the enablement of such features, such as a shape of an illumination spot (e.g., as illustrated in FIGS. 8B and 9A-9E), a telecentric arrangement (e.g., as illustrated in FIGS. 8A and 10B), a homogenizer for a light guide (e.g., as illustrated in FIGS. 8A and 10A-13), etc.

Figure 2:
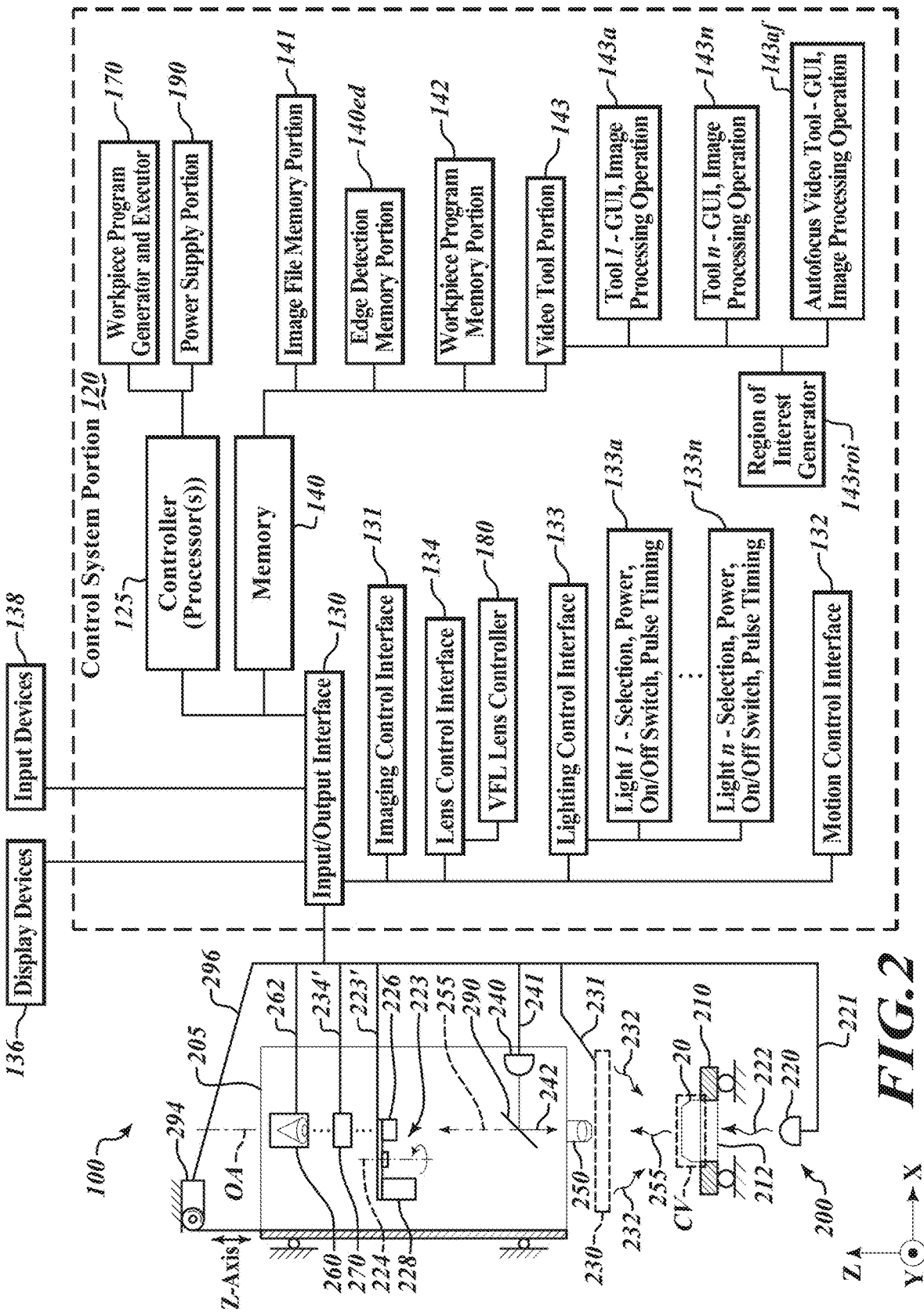
FIG. 2 is a block diagram of a control system portion and a vision components portion of a machine vision metrology system similar to that of FIG. 1 and including certain features disclosed herein.

FIG. 2 is a block diagram of a control system portion 120 and a vision components portion 200 of a machine vision metrology system 100 similar to the machine vision metrology system of FIG. 1, including certain features disclosed herein. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. The workpiece stage 210 is controllably movable along λ and Y axes that lie in a plane that is generally parallel to the surface of the stage where a workpiece 20 may be positioned.

The optical assembly portion 205 includes a camera system 260 (i.e., including a camera), an interchangeable objective lens 250 and a variable focal length (VFL) lens 270. In various implementations, the VFL lens 270 may be a tunable acoustic gradient ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system. The TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and Applications of TAG lenses are described in greater detail in U.S. Pat. Nos. 10,178,321; 9,930,243; 9,736,355; 9,726,876; 9,143,674; 8,194,307; and 7,627,162, each of which is hereby incorporated herein by reference in its entirety.

In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis that is generally orthogonal to the X and Y axes by using a controllable motor 294 that drives an actuator to move the optical assembly portion 205 along the Z axis to change the focus of the image of a workpiece 20. The controllable motor 294 is connected to an input/output interface 130 via a signal line 296. As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180 according to various principles disclosed herein, as described in greater detail below. A workpiece 20 may be placed on the workpiece stage 210. The workpiece stage 210 may be controlled to move relative to the optical assembly portion 205, such that the field of view of the interchangeable objective lens 250 moves between locations on a workpiece 20, and/or among a plurality of workpieces 20, etc.

One or more of a stage light source 220, a lighting configuration 230, and a coaxial light source 240 may emit source light 222, 232, and/or 242, respectively, to illuminate a workpiece 20 or workpieces 20. The lighting configuration 230 may be formed in accordance with certain principles as disclosed herein, as will be described in more detail below. In various exemplary embodiments, pulsed (e.g., strobed) illumination may be used. For example, during an image exposure, the lighting configuration 230 may emit strobed source light 232 toward a central volume CV in which at least part of the workpiece 20 is located. In another example, during an image exposure, the coaxial light source 240 may emit strobed source light 242 along a path including a beam splitter 290 (e.g., a partial mirror/reflective surface). The source light 232, 242 is reflected as image light 255, and the image light used for imaging passes through the interchangeable objective lens 250, the turret lens assembly 223 and the VFL (TAG) lens 270, and is gathered by the camera system 260. A workpiece image exposure, which includes the image of the workpiece(s) 20, is captured by the camera system 260, and is output on a signal line 262 to the control system portion 120.

As will be described in more detail below with respect to FIGS. 6A-14, the lighting configuration 230 includes a plurality of lighting portions configured to illuminate the workpiece 20 for producing image light 255, wherein each lighting portion is configured to direct light toward a central volume CV (e.g., in which at least part of the workpiece 20 may be positioned). As noted above, the objective lens 250 is configured to input image light 255 arising from the workpiece 20, wherein the objective lens 250 is configured to transmit the image light along an imaging optical path, and has an optical axis OA. In the example of FIG. 2, the objective lens 250 transmits the image light along the imaging optical path that passes through the VFL lens 270 to the camera 260. The camera 260 is configured to receive the image light transmitted along the imaging optical path and to provide images of the workpiece 20. As will be described in more detail below with respect to FIG. 3, a focus position EFP that corresponds to the focus of the images is configured to be variable within a focus range Refp along the optical axis. In various implementations, the lighting configuration 230 is controlled through a lighting control interface 133 (e.g., including a light controller portion for controlling the lighting configuration 230, such as light controller portion 133n).

Various light sources (e.g., the light sources 220, 230, 240) may be connected to the lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125 (e.g., comprising or operating as part of one or more processors), the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

Figure 3:
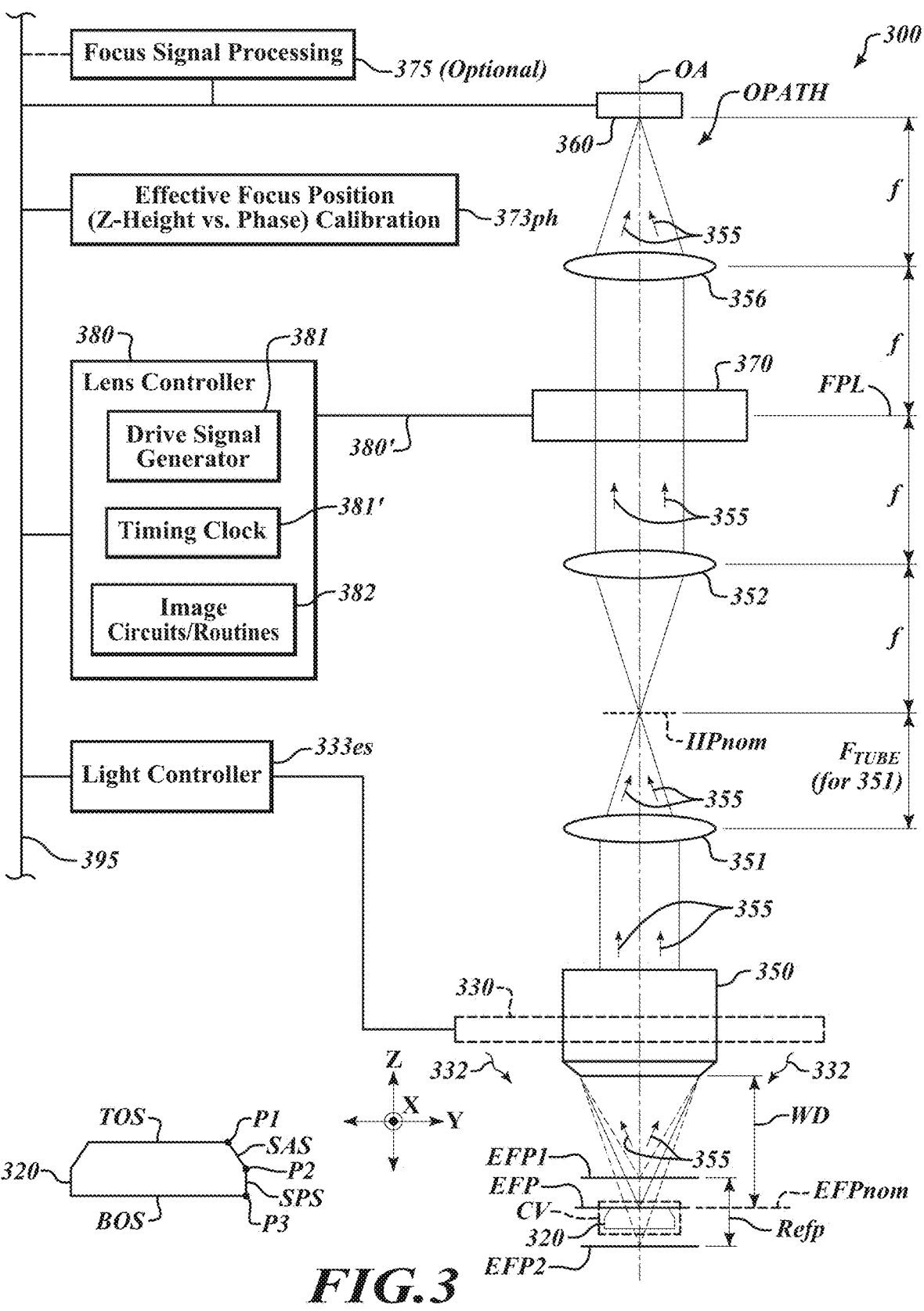
FIG. 3 is a schematic diagram of an imaging system that may be adapted to a precision non-contact metrology system such as a machine vision metrology system and including certain features disclosed herein.

The lighting control interface 133 may include lighting control elements 133a-133n that control, for example, the selection, power, on/off switch, and pulse/strobe timing, if applicable, for the various corresponding light sources of the machine vision metrology system 100. In various implementations, an instance of strobed illumination may be regarded as a type of pulsed illumination, as the terms are utilized herein. In some implementations, a light controller 333es as shown in FIG. 3 may provide pulse/strobe timing signals to one or more of the lighting control elements 133a-133n, such that they provide an image exposure pulse/strobe timing that is synchronized with a desired phase time of the VFL lens focus position modulation (e.g., in accordance with certain stored calibration data), and as described in greater detail below. In some implementations, the light controller 333es of FIG. 3 and one or more of the lighting control elements 133a-133n of FIG. 2 may be merged and/or indistinguishable.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 includes an autofocus video tool 143af that determines the GUI, image-processing operation, etc., for focus height (i.e., effective focus position (Z-coordinate/Z-height)) measurement operations. In various implementations, the autofocus video tool 143af may additionally include a high-speed focus height tool that may be utilized to measure focus heights with high speed using hardware illustrated in FIG. 3, as described in more detail in U.S. Pat. No. 9,143,674 as incorporated above. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection/measurement operations, and/or to create and/or modify part programs, to view the images captured by the camera system 260, and/or to directly control the vision components portion 200.

In various exemplary implementations, when a user utilizes the machine vision metrology system 100 to create a part program for the workpiece 20, the user generates part program instructions by operating the machine vision metrology system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision metrology system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

FIG. 3 is a diagram of an imaging system 300 that may be adapted to a precision non-contact metrology system such as a machine vision metrology system and including certain features disclosed herein. It will be appreciated that certain numbered components 3XX of FIG. 3 may correspond to and/or provide similar operations or functions as similarly numbered components 2XX of FIG. 2, and may be similarly understood unless otherwise indicated.

As will be described in more detail below, an imaging optical path OPATH (also called a workpiece imaging optical path herein) comprises various optical components arranged along a path that conveys image light 355 from the workpiece 320 to the camera 360. The image light is generally conveyed along the direction of their optical axes OA. In the implementation shown in FIG. 3, all of the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes the VFL lens 370 (which may be included in a 4f imaging configuration) and is utilized at least in part for imaging the workpiece 320 during a workpiece image exposure.

As shown in FIG. 3, the imaging system 300 includes a lighting configuration 330, a light controller 333es, an objective lens 350, a tube lens 351, a relay lens 352, the VFL (TAG) lens 370, a relay lens 356, a lens controller 380, a camera 360, an effective focus position (Z-height vs. phase) calibration portion 373ph, and a workpiece focus signal processing portion 375 (optional). In various implementations, the various components may be interconnected by direct connections or one or more data/control busses (e.g., a system signal and control bus 395) and/or application programming interfaces, etc. In various implementations, a Z-height (e.g., of a surface point on a workpiece) may correspond to and/or alternatively be referenced as a Z-coordinate, and/or a focus position, for which these terms may be utilized interchangeably in certain instances herein.

As will be described in more detail below, in various implementations, the VFL lens controller 380 may control a drive signal of the VFL lens 370 to periodically modulate optical power of the VFL lens 370 over a range of optical powers that occur at respective phase timings within the periodic modulation. The camera 360 (e.g., including an image sensor) receives light transmitted along an imaging optical path OPATH through the VFL lens 370 during an image exposure and provides a corresponding camera image. The objective lens 350 inputs image light arising from a workpiece 320 during an image exposure, and transmits the image light along the imaging optical path OPATH through the VFL lens 370 to the camera 360 during the image exposure, to provide a workpiece image in a corresponding camera image. An effective focus position EFP in front of the objective lens 350 during an image exposure corresponds to the optical power of the VFL lens 370 during that image exposure. The light controller 333es is configured to control an image exposure timing used for a camera image.

With respect to the example implementation shown in FIG. 3, the lighting configuration 330 is configured to emit the source light 332 (e.g., with pulsed/strobed illumination) toward a central volume CV including at least part of a workpiece 320. The objective lens 350 receives the image light 355 (e.g., workpiece light) that is focused at an effective focus position EFP proximate to the workpiece 320, and outputs the image light 355 to the tube lens 351. The tube lens 351 receives the image light 355 and outputs it to the relay lens 352. In other implementations, other light sources may illuminate the field of view in a coaxial or non-coaxial manner; for example, light sources 220 or 240 of FIG. 2.

As will be described in more detail below with respect to FIGS. 6A-14, the lighting configuration 330 of FIG. 3 includes a plurality of lighting portions configured to illuminate the workpiece 320 for producing the image light 355, wherein each lighting portion is configured to direct light 332 toward the central volume CV (e.g., in which at least part of the workpiece 320 may be positioned). The objective lens 350 is configured to input the image light 355 arising from the workpiece 320, and is configured to transmit the image light 355 along the imaging optical path in OPATH, wherein the objective lens 350 has an optical axis OA. The camera 360 is configured to receive the image light 355 transmitted along the imaging optical path OPATH and to provide images of the workpiece 320, wherein a focus position EFP that corresponds to the focus of the images is configured to be variable within a focus range Refp along the optical axis OA.

The lighting configuration 330 is controlled by a light controller 333es to direct the light 332 toward the central volume CV for illuminating the workpiece 320. In various implementations, the light controller 333es is configured to control the VFL lens to periodically modulate the optical power of the VFL lens 370 over a range of optical powers at an operating frequency so as to vary the focus position of the system over a plurality of positions within the focus range Refp. The camera 360 is utilized to acquire an image stack comprising a plurality of images of the workpiece 320 (e.g., as described in more detail below with respect to FIGS. 4 and 5), wherein each image of the image stack corresponds to a different focus position along the optical axis OA (e.g., as each corresponding to a different Z-height in the example of FIG. 3). Focus curve data may be determined based at least in part on an analysis of the images of the image stack, wherein the focus curve data indicates three dimensional positions of a plurality of surface points on the workpiece 320.

In the example of FIG. 3, an enlarged illustration of the workpiece 320 shown on the left includes a top orthogonal surface TOS, a bottom orthogonal surface BOS, a side angled surface SAS, and a side parallel surface SPS, for which each of the orthogonal, angled and parallel references are in relationship to the optical axis OA. A surface point P1 corresponds to a corner between a top orthogonal surface TOS and the side angled surface SAS, while a surface point P2 corresponds to a corner between the side angled surface SAS and the side parallel surface SPS, and a surface point P3 corresponds to a corner between the side parallel surface SPS and the bottom orthogonal surface BOS.

It will be appreciated that the light provided by the lighting configuration 330 as directed toward the workpiece 320 will illuminate each of the top orthogonal surface TOS, the side angled surface SAS, and the side parallel surface SPS, so as to enable imaging of each surface (i.e., as enabling corresponding determinations of three dimensional positions of surface points on each of the imaged surfaces, such as for surface points P1, P2 and/or P3). In relation to the side parallel surface SPS, it will be appreciated that with the non-coaxial illumination provided from the different discrete directions as disclosed herein, the side parallel surface SPS will be illuminated (e.g., with some of the light being scattered into the imaging system along the imaging optical path OPATH to enable determination/measurement of three dimensional positions of surface points on the side parallel surface SPS).

In various implementations, the objective lens 350 may be an interchangeable objective lens, and the tube lens 351 may be included as part of a turret lens assembly (e.g., similar to the interchangeable objective lens 250 and the turret lens assembly 223 of FIG. 2). In the implementation shown in FIG. 3, image light 355 arising from a nominal focal plane of the objective lens 350 is focused by the tube lens 351 to form an intermediate image at a nominal intermediate image plane IIPnom. When the VFL lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the VFL lens 370. The VFL lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the lighting configuration 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance FTUBE of the tube lens 351 is illustrated as being approximately equidistant to a midpoint between the lenses 351 and 352, as is a focal distance f of the relay lens 352. In alternative implementations, the focal distance FTUBE for the tube lens 351 may be made to be different than the focal distance f of the relay lens 352 (which corresponds to one of the 4 f's of the 4f optical configuration).

In various implementations, the illustrated 4f optical configuration permits placing the VFL (TAG) lens 370 (e.g., which may be a low numerical aperture (NA) device) at the Fourier plane FPL of the objective lens 350. This configuration may maintain the telecentricity at the workpiece 320, and may minimize scale change and image distortion (e.g., including providing constant magnification for each effective focus position (Z-height) of the workpiece 320). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380' (e.g., for providing and/or adjusting an amplitude driving signal, as will be described in more detail below). In various implementations, the imaging system 300 (which may also be referenced as a VFL lens system) may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing of the VFL lens 370, as well as controlling, monitoring and adjusting the driving and response of the VFL lens 370. In various implementations, the image circuits/routines 382 perform standard imaging operations for the optical system, synchronized with the phase timings of the VFL lens 370.

With respect to the general operations of the VFL lens 370, in various implementations as described above, the lens controller 380 may rapidly adjust or modulate the optical power of the VFL lens 370 periodically, to achieve a high-speed VFL lens that periodically modulates its optical power at a TAG lens resonant frequency of 400 kHz, 250 kHz, 70 kHz, or 30 kHz, etc. As shown in FIG. 3, by using the periodic modulation of a signal to drive the VFL lens 370, the effective focus position EFP of the imaging system 300 (that is, the focus position in front of the objective lens 350) may be rapidly moved within a range Refp (e.g., a focus range or an autofocus search range, etc.) bound by an effective focus position EFP1 (or EFPmax or peak focus distance Z1max+) corresponding to a maximum optical power of the VFL lens 370 in combination with the objective lens 350, and an effective focus position EFP2 (or EFPmin or peak focus distance Z1max−) corresponding to a maximum negative optical power of the VFL lens 370 in combination with the objective lens 350. In various implementations, the effective focus positions EFP1 and EFP2 may approximately correspond to phase timings of 90 degrees and 270 degrees. For purposes of discussion, the middle of the range Refp may be designated as EFPnom, and may approximately correspond to zero optical power of the VFL lens 370 in combination with the nominal optical power of the objective lens 350. According to this description, EFPnom may approximately correspond to the nominal focal length of the objective lens 350 in some implementations (e.g., which may correspond to a working distance WD of the objective lens 350).

In some implementations, the optional focus signal processing portion 375 may input data from the camera 360 and may provide data or signals that are utilized to determine when an imaged surface region (e.g., including one or more surface points of a workpiece 320) is at an effective focus position. For example, a group of images acquired by the camera 360 at different effective focus positions (Z-heights), such as part of an image stack, may be analyzed using a known "maximum contrast" or "best focus image" analysis to determine when an imaged surface region of a workpiece 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (during the sweeping of multiple effective focus positions) of the VFL lens 370, and determine an image and/or image timing at which a target feature (e.g., including one or more surface points of a workpiece) is best focused.

In some implementations, the focus signal processing portion 375 may determine a phase timing corresponding to a best focus (e.g., of a workpiece feature) and output that "best focus" phase timing value to an effective focus position calibration portion 373ph. The effective focus position (Z-height vs. phase) calibration portion 373ph may store "phase" calibration data determined by calibration processes such as those disclosed in the incorporated references. The effective focus position calibration portion 373ph may provide effective focus position (Z-height vs. phase) calibration data that relates respective effective focus positions (Z-heights) to respective "best focus" phase timings within a period of a resonant frequency of the VFL lens 370. In various implementations, the associated recorded effective focus position (Z-height) calibration data 373ph may be merged with and/or indistinguishable from the lens controller 380, the workpiece focus signal processing portion 375, or a host computer system connected to the system signal and control bus 395, etc.

In various implementations, the light controller 333es controls an image exposure time of the imaging system 300 (e.g., relative to a phase timing of the periodically modulated effective focus position). More specifically, during an image exposure, the light controller 333es may use the effective focus position (Z-height) calibration data available in the effective focus position (Z-height vs. phase) calibration portion 373ph and control the lighting configuration 330 to pulse/strobe at a respective time. For example, the light controller 333es may control the lighting configuration 330 to pulse/strobe at a respective phase timing within a period of a standard imaging resonant frequency of the VFL lens 370, so as to acquire an image having a particular effective focus position within the sweeping (periodic modulation) range of the VFL lens 370. It will be appreciated that the operations of the light controller 333es and other features and elements outlined above may be implemented to govern workpiece image acquisitions.

Figure 4:
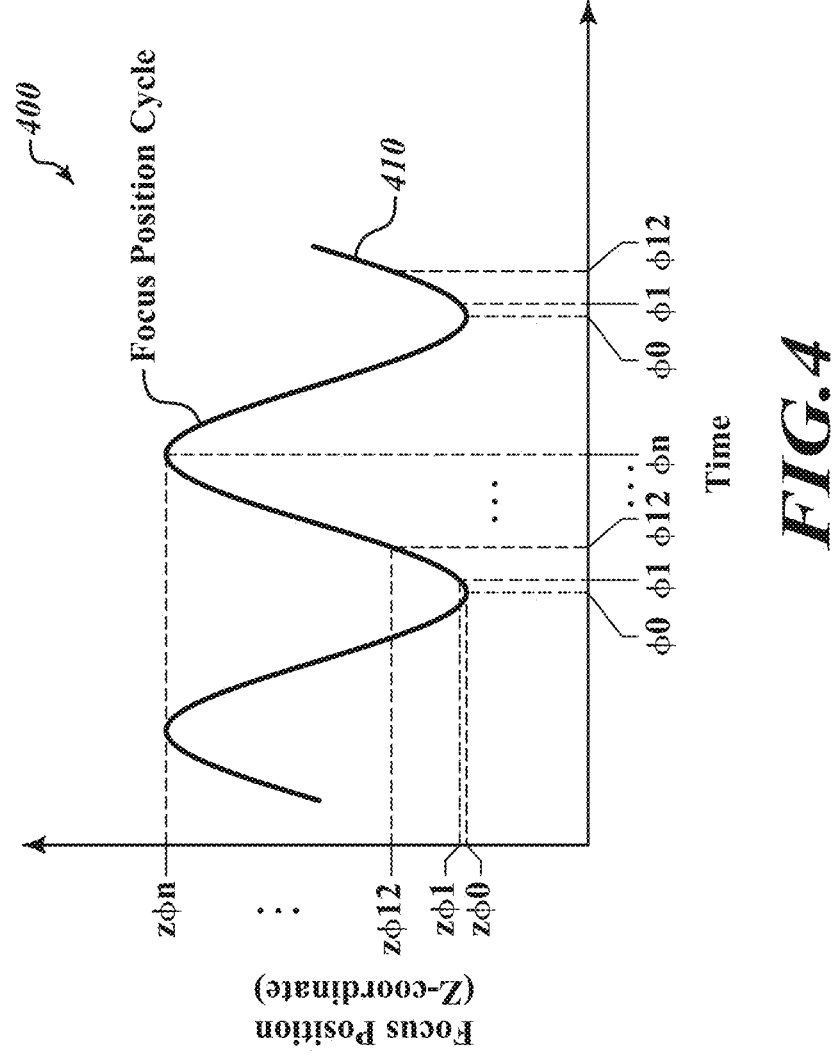
FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective focus position/Z-coordinate.

FIG. 4 is a chart of a timing diagram showing a periodically modulated focus position of a system such as that of FIGS. 1-3, and also qualitatively showing how pulsed/strobed illumination can be timed to correspond with a respective phase timing of the periodically modulated focus position to expose an image focused at a respective Z-coordinate. In the illustrated example, each focus position has a corresponding Z-coordinate, for which an optical axis OA (e.g., of the objective lens 350) may define and/or otherwise be aligned (e.g., be coaxial or in parallel with, etc.) a Z-axis of a corresponding coordinate system (e.g., for which the Z-coordinates may alternatively be referenced as Z-axis coordinates and/or Z-heights). The periodically modulated focus position is represented by a sinusoidal curve 410. The relationship of the focus position (i.e., as indicated by corresponding Z-coordinates) to the phase timing may be established by calibration according to known principles (e.g., by repeatedly stepping a surface to a known Z-coordinate, and then manually or computationally determining the phase timing that best focuses an image at the known Z-coordinate, and storing that relationship in a lookup table or the like).

The diagram 400 also qualitatively shows how pulsed/strobed illumination can be timed to correspond with a respective phase timing (e.g., $\phi 0$, $\phi 1$, $\phi 12$, $\phi n$, etc.) of the periodically modulated focus position to expose an image focused at a respective Z-coordinate (e.g., $z\phi 0$, $z\phi 1$, $z\phi 12$, $z\phi n$, etc.) That is, in the illustrated example, while the camera 360 is acquiring an image during an integration period, if a pulse of illumination is short relative to the period of the focus modulation and is provided at the phase timing $\phi 0$, then the focus position will be at the Z-coordinate $z\phi 0$, and any workpiece surface/surface point that is located at the Z-coordinate $z\phi 0$ will be in focus in the resulting image. A similar description applies for the other exemplary phase timings and Z-coordinates shown in the diagram 400.

It will be understood that the phase timings shown in the diagram 400 are exemplary only and not limiting. More generally, any phase timing selected by a user or automatically selected by a control system will have an associated focus position within the range of Z-coordinates $z\phi 0$-$z\phi n$, which represent the minimum and maximum Z-coordinates of the periodically modulated focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). For example, one, or several, or thousands, etc., of such pulses may be integrated in an integration period, in some implementations. The effect will be to increase the image exposure corresponding to that particular phase timing and/or Z-coordinate in the resulting image. As one specific example implementation, for a variable focal length lens that modulates at a frequency of 72 kHz and an imaging array in a camera operating at frames per second, a single camera frame acquisition time may correspond to 2,400 cycles of the variable focal length lens and the resulting focus position Z-coordinate. It will be appreciated that the exemplary phase timings $\phi 1$ and $\phi 12$ are shown on a rising slope of the focus position cycle. In some embodiments, pulses may also be integrated in an integration period which corresponds to the same Z-coordinates during a falling slope of the focus position cycle.

Figure 5:
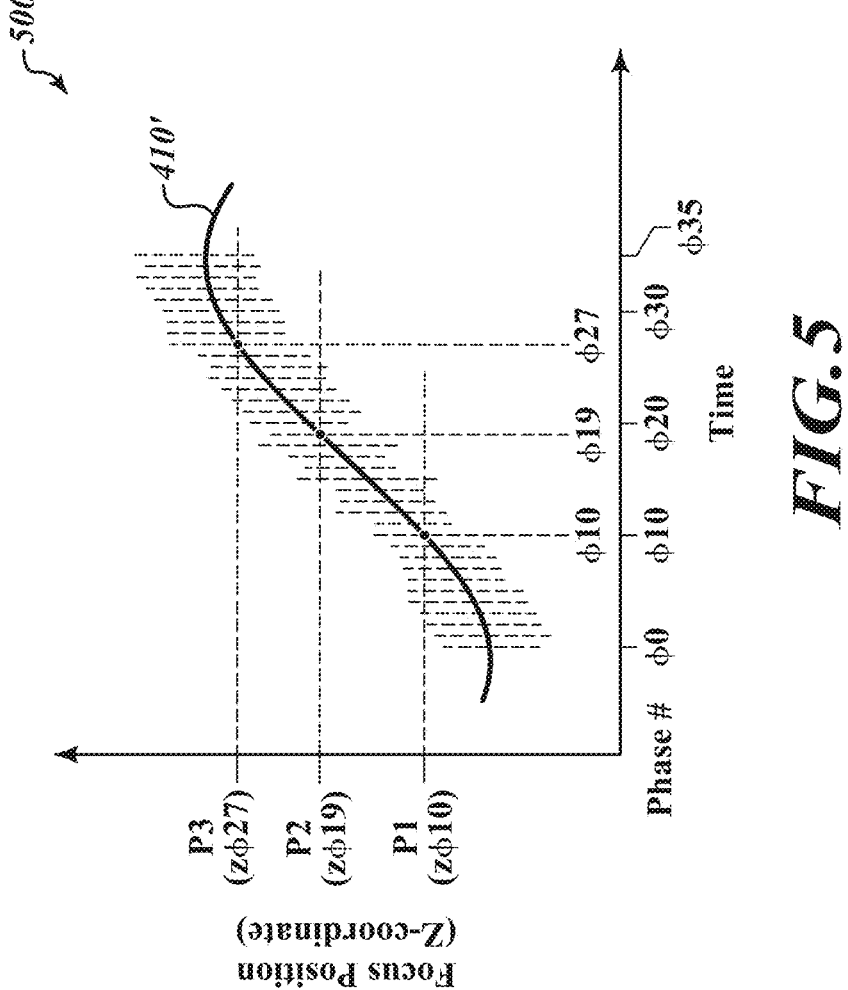
FIG. 5 is a chart showing an expanded portion of the periodically modulated focus position shown in FIG. 4, phase timings corresponding to those usable to collect an image stack, and also qualitatively showing how first, second and third instances of pulsed/strobed illumination that correspond with first, second and third phase timings of the periodically modulated focus position can be utilized to produce corresponding exposure images that provide image focus for surface points/workpiece features that are located at different focus positions/Z-coordinates.

FIG. 5 is a chart 500 showing a horizontally expanded portion 410' of the sinusoidal curve 410 of the periodically modulated focus position shown in FIG. 4, and phase timings corresponding to those usable to collect an image stack (e.g., represented by the phase timing positions of the vertical dashed lines in the chart 500). FIG. 5 also qualitatively shows how first, second and third particular instances of pulsed illumination that correspond with first, second and third phase timings (e.g., in this particular example exemplary phase timings $\phi 10$, $\phi 19$ and $\phi 27$) of the periodically modulated focus position can be utilized to produce corresponding exposure images that provide image focus for workpiece features/surface points that are located at different Z-coordinates (e.g., such as a first surface point P1 located at a first Z-coordinate $Z\phi 10$, a second surface point P2 located at a second Z-coordinate $Z\phi 19$, and a third surface point P3 located at a third Z-coordinate $z\phi27$, such as may correspond to the surface points P1, P2 and P3 of the example of FIG. 3).

Regarding the phase timings corresponding to those usable to collect an image stack (represented by the phase timing positions of the vertical dashed lines in the chart 500), in accordance with principles disclosed herein, in one implementation an image stack (or multiple image stacks) may be acquired with respect to one or more regions of interest of a representative workpiece. For example, an image stack may be acquired by exposing a first image using one or more strobe illumination pulses (e.g., over one or more periods) coinciding with the phase timing $\phi0$. A second image in the image stack may be similarly acquired using the phase timing $\phi1$, and so on up to phase timing $\phi35$ in the illustrated example. It will be understood that an image stack images a field of view using various focus positions, and generally can include any desired number of images with focus positions corresponding to desired Z-coordinates, acquired using corresponding phase timings.

As noted above, FIG. 5 illustrates in part how first, second and third particular instances of strobed illumination that correspond with first, second and third phase timings (e.g., the exemplary phase timings $\phi10$, $\phi19$ and $\phi27$) of the periodically modulated focus position can be utilized to produce corresponding exposure images that provide image focus for surface points that are located at different Z-coordinates (e.g., such as first surface point P1 located at a first Z-coordinate $Z\phi10$, a second surface point P2 located at a second Z-coordinate $Z\phi19$, and a third surface point P3 located at a third Z-coordinate $z\phi27$).

As illustrated in FIG. 5, the first, second and third surface points in the field of view on a representative workpiece (e.g., workpiece 320) are indicated as having a sufficient image focus in respective images of an image stack. The first surface point P1 is indicated as being best or sufficiently focused at a Z-coordinate $Z\phi10$ which corresponds to a phase timing of $\phi10$, and the second surface point P2 is indicated as being best or sufficiently focused at a Z-coordinate $Z\phi19$ which corresponds to a phase timing of $\phi19$, and a third surface point P3 is indicated as being best or sufficiently focused at a Z-coordinate $z\phi27$ which corresponds to a phase timing of $\phi27$. In various implementations, the contrast in one or more regions of interest may be analyzed (e.g., according to known methods) in each image of an image stack. Utilizing such processes, the particular images and/or interpolated Z-coordinates indicated as providing the best or sufficient contrast and focus for the first, second and third surface points P1, P2 and P3, respectively, may be determined.

In various implementations, a determination of an image which has the best or sufficient image focus for a workpiece feature in a region of interest may be made according to various techniques. In one specific example implementation, a technique including an analysis of a focus curve may be utilized. A focus curve may be formed based on focus curve data points, which may be established according to known methods (e.g., as described in incorporated references). Briefly, in one exemplary method, for each captured image in the image stack, a focus metric value is calculated based on the respective region of interest in that image, and that focus metric value becomes a data point on the focus curve (e.g., related to the corresponding phase timing and Z-coordinate at which the image was captured). This results in focus curve data, which may be referred to simply as a "focus curve" or "autofocus curve." Exemplary techniques for the determination and analysis of image stacks and focus curves are taught in U.S. Pat. Nos. 8,581,162; 9,060,117 and 10,880,468, each of which is hereby incorporated herein by reference in its entirety.

In some implementations, the processing including the obtaining of the image stack may be referenced as a type of points-from-focus (PFF) process, as utilized to determine Z-coordinates of points on the workpiece surface. The PFF image stack may be processed to determine or output a Z-coordinate map (e.g. a point cloud) that quantitatively indicates a set of 3 dimensional surface coordinates (e.g., corresponding to a surface shape or profile of the workpiece). In such a PFF type analysis, in some implementations each focus curve may correspond to a single point or X,Y location on the workpiece surface. That is, the peak of each focus curve may indicate the Z-coordinate of the single point along the direction of the optical axis OA of the system. In various implementations, the PFF type analysis repeats this process for multiple surface points (e.g., each with a corresponding region of interest) across the workpiece surface such that an overall profile of the workpiece surface can be determined. In general, the process may be performed for multiple surface points that are within a field of view (i.e., as captured within the images of the image stack), where for each image of the image stack, a particular ROI(i) may correspond to an X,Y location (e.g., as may correspond to a particular point) on the workpiece surface (e.g., with the point at the center of the ROI).

As indicated above, in various implementations, the analysis of an image stack includes determining focus curve data for the image stack which indicates a focus position at which a surface point is in focus (e.g., as may correspond to a local peak or other characteristic of the focus curve). For example, the focus curve data may indicate a first focus position (e.g., corresponding to a Z-coordinate $Z\phi10$, which may also be referenced as Z1) at which the first surface point P1 is in focus, a second focus position (e.g., corresponding to a Z-coordinate $Z\phi19$, which may also be referenced as Z2) at which the second surface point P2 is in focus, and a third focus position (e.g., corresponding to a Z-coordinate $Z\phi27$, which may also be referenced as Z3) at which the third surface point P3 is in focus.

In addition to the determinations/indications of the Z-coordinates of each of the surface points, the focus curves may each correspond to particular X and Y coordinates. For example, in one implementation the surface point P1 may be in a first region of interest (e.g., as centered in the first region of interest) of the images of the image stack as corresponding to a field of view, for which the first region of interest may be associated with X and Y coordinates which also correspondingly indicate the X and Y coordinates (e.g., X1 and Y1) of the surface point P1. Similarly, the surface point P2 may be in a second region of interest (e.g., as centered in the second region of interest) of the images of the image stack as corresponding to the field of view, for which the second region of interest may be associated with X and Y coordinates which also correspondingly indicate the X and Y coordinates (e.g., X2 and Y2) of the surface point P2. In some instances, the surface point P3 may be in the same region of interest as the second surface point (i.e., the second region of interest) of the images of the image stack as corresponding to the field of view, and may have the same or similar X and Y coordinates (e.g., X3=X2 and Y3=Y2) as the surface point P2, but for which the surface points P2 and P3 may have different Z coordinates (e.g., Z2 and Z3, respectively). In various implementations, the Z coordinates Z2 and Z3 may be determined based on local focus peaks within a single focus curve and/or based on other known techniques.

Thus, the focus curve data, as based at least in part on an analysis of the images of the image stack, indicates 3 dimensional positions (e.g., X, Y, Z coordinates) of a plurality of surface points on the workpiece. In the specific examples above, the focus curve data indicates three dimensional positions of the surface points P1, P2 and P3 as corresponding to determined coordinates (X1, Y1, Z1), (X2, Y2, Z2) and (X3, Y3, Z3), respectively. In various implementations, a measurement related to the surface points may additionally be made based on an analysis of the focus curve data. For example, a distance between the surface points P1 and P2, or P2 and P3, may be determined based on an analysis of the focus curve data (e.g., in relation to the determined three-dimensional coordinates and known techniques for determining distances between such three-dimensional coordinates).

Figures 6A, 6B:
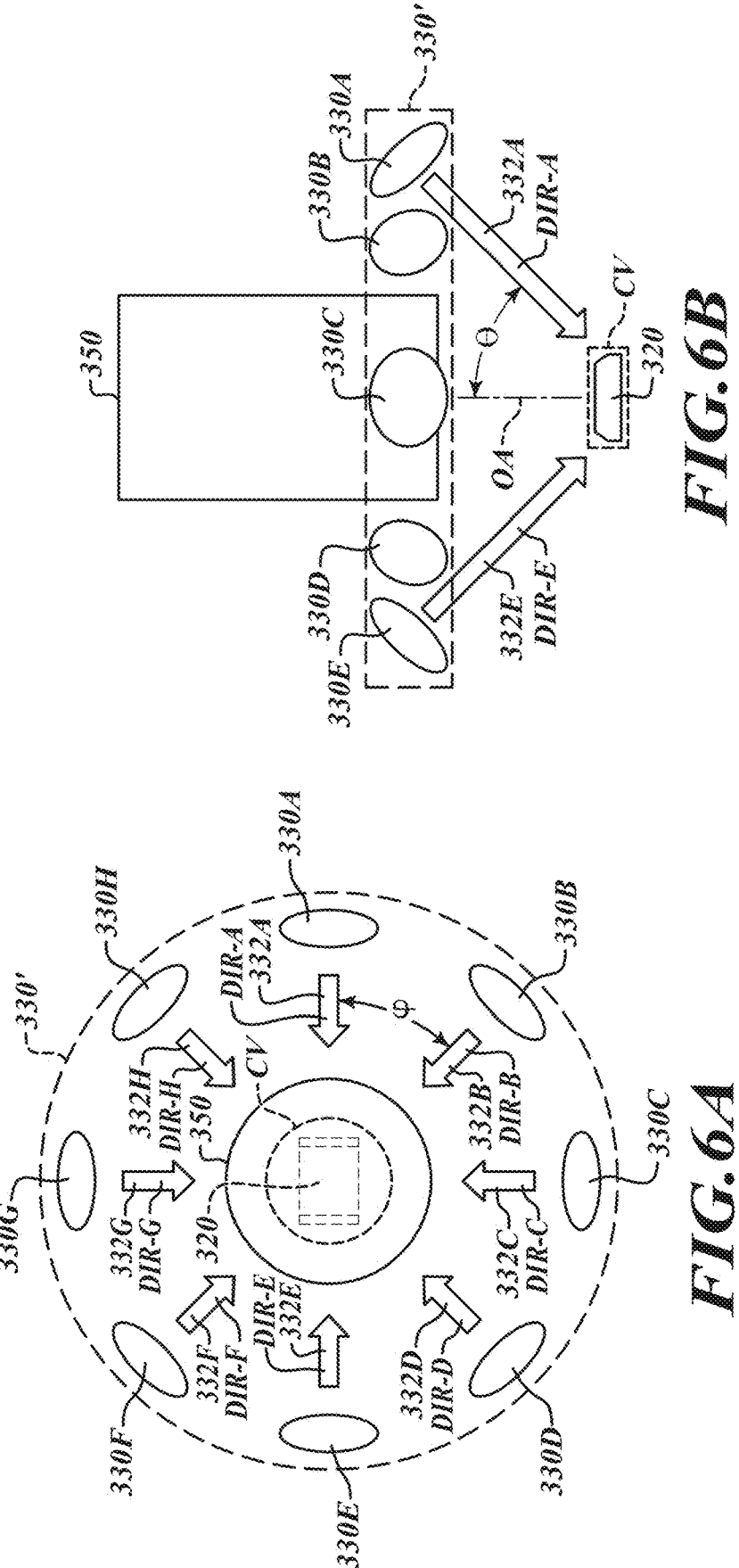
FIGS. 6A and 6B are diagrams of an exemplary implementation of a lighting configuration with eight lighting portions.

In general, for workpieces with non-planar surfaces, it may be desirable to provide illumination from multiple directions in order to better image workpiece surfaces (e.g., workpiece surfaces that are non-orthogonal to the optical axis) such as with slopes/angled surfaces, such as sidewalls (e.g., workpiece surfaces that are angled relative to, or nominally parallel with, the optical axis, etc.). In certain prior systems, illumination from multiple directions may have been provided by conventional ring illumination (e.g., utilizing a ring light made from a single circular florescent bulb, or for which a light source may be guided by a fiber bundle with the output of the fiber bundle arranged into a ring geometry). In certain implementations, typical ring illumination may be characterized as generating light in multiple directions, including in relation to a workpiece, from a fixed inclination (e.g., according to an angle θ) and in all azimuthal directions (e.g., according to angles φ). However, such implementations utilizing convention ring illumination may be relatively inefficient (e.g., power inefficient). In accordance with principles as disclosed herein (e.g., such as illustrated in FIGS. 6A and 6B), illumination is provided from multiple discrete directions. Such configurations may in some instances be characterized as approximating ring illumination (e.g., in an annular arrangement), with light provided in several discrete azimuthal directions.

In various implementations, different numbers of lighting portions may be included as part of a lighting configuration, as will be described in more detail below. For example, in the implementation of FIGS. 6A and 6B, eight lighting portions are utilized to provide light from eight discrete azimuthal directions, while in the implementation of FIG. 7, six lighting portions are utilized to provide light in six discrete azimuthal directions. As illustrated in FIG. 6B, for each of the lighting portions, the light is provided from a fixed inclination (e.g., corresponding to an angle θ) and eight corresponding discrete azimuthal directions (e.g., each corresponding to an angle (p). Such configurations may correspond to high efficiency for providing the illumination (e.g., in comparison to traditional ring illumination), while also providing desirable imaging capability for angled or other workpiece surfaces (e.g., surfaces that are not orthogonal to the optical axis). It is further noted that the desirable illumination and resulting accurate imaging of such workpiece surfaces enables highly accurate determinations/measurements of three-dimensional positions of the surface points on the workpiece (e.g., in accordance with points-from-focus and/or other processes that may be performed for determining three dimensional positions of surface points, etc.) In various implementations, it is desirable for a lighting configuration to include at least four lighting portions.

FIGS. 6A and 6B illustrate a lighting configuration 330' which includes eight lighting portions 330A-330H, which are configured to illuminate the workpiece 320 for producing image light (e.g., as described above with respect to FIGS. 2 and 3). Various components of the lighting portions 330A-330H may be understood in relation to the examples of FIGS. 8A, 10A and 10B, as will be described in more detail below (e.g., for which each lighting portion may include an imaging lens portion as well as certain other components). As illustrated in FIGS. 6A and 6B (i.e., which show a top view and a side view, respectively), the lighting portions 330A-330H are distributed in an arrangement in which each lighting portion is configured to direct light toward the central volume CV (e.g., in which at least part of the workpiece 320 may be located). The light directed toward the central volume CV by each of the imaging lens portions of the lighting portions 330A-330H is configured to overlap and to form a nominally uniform intensity of illumination within at least part of the central volume CV, such that the intensity of the illumination within the central volume CV is configured to be nominally the same at a plurality of focus positions. In accordance with this arrangement, each lighting portion 330A-330H directs light 332A-332H in a direction DIR-A to DIR-H, respectively. In FIG. 6B, for simplicity of the illustration, only the light 332A and 332E from the lighting portions 330A and 330E are illustrated as directed in the directions DIR-A and DIR-E, respectively. As used herein, the term "nominally" encompasses variations of one or more parameters that fall within acceptable tolerances. As an example, in one implementation a term such as "nominally uniform intensity of illumination" in a central volume may indicate that there is an approximately uniform intensity of illumination as corresponding to a minimal variance of the intensity of the illumination within the central volume (e.g., such as a variance of less than 5%, or less than 2%, or less than 1%, such as in accordance with acceptable tolerances, etc.)

In the example of FIGS. 6A and 6B, the arrangement in which the lighting portions are distributed is an annular arrangement in which each lighting portion is located at a different angular position within the annular arrangement. In relation to a 360 degree reference for positioning within the annular arrangement, the eight lighting portions 330A-330H are located at 45 degree increments around the 360 degree annular reference configuration (e.g., as each corresponding to a respective angle φ, such as an angle $\varphi_A$ of 0 degrees for lighting portion 330A, an angle $\varphi_B$ of 45 degrees for lighting portion 330B, an angle $\varphi_C$ of 90 degrees for lighting portion 330C, etc.)

Figure 7:
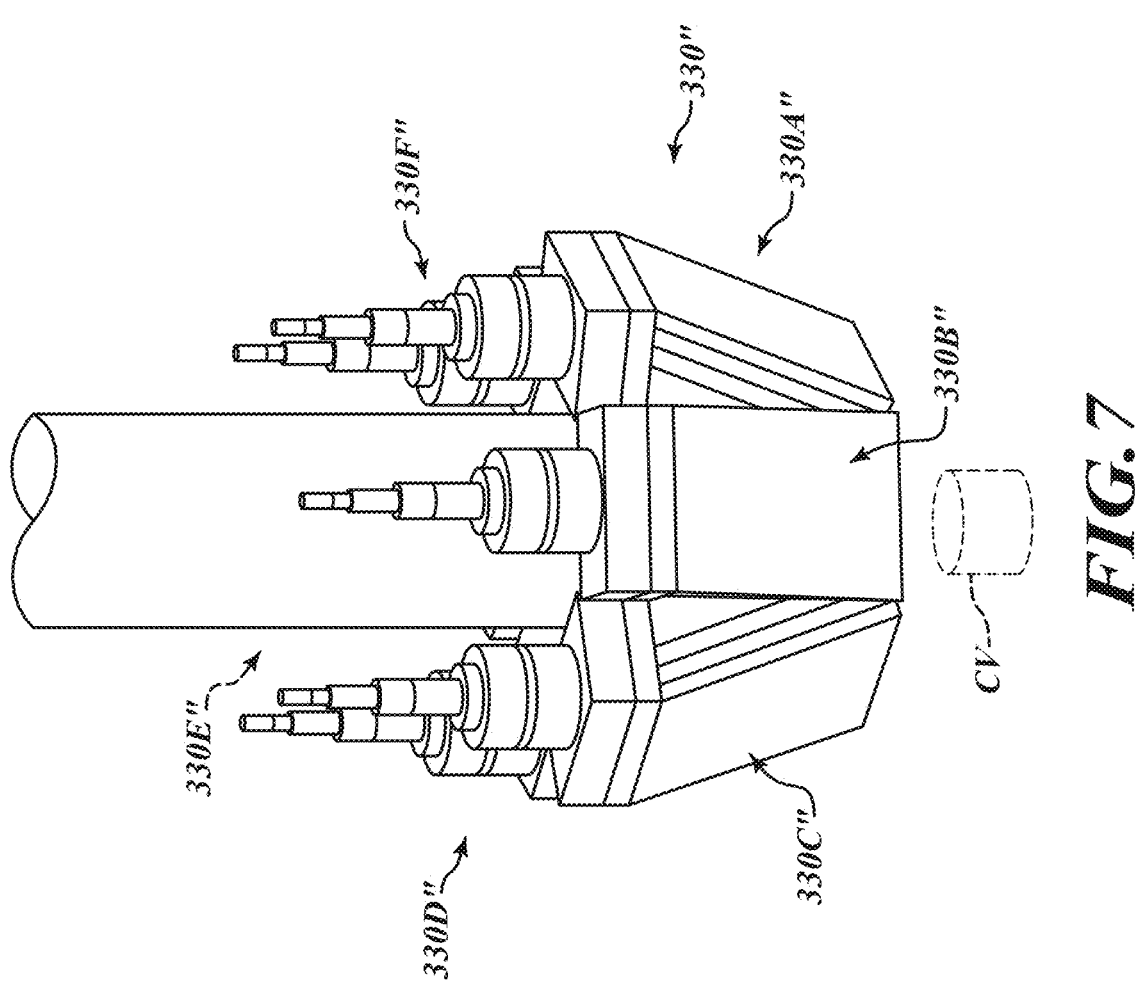
FIG. 7 is a diagram of an exemplary implementation of a lighting configuration with six lighting portions.

In the example of FIG. 7, the lighting configuration 330" includes six lighting portions 330A"-330F" configured to direct light toward a central volume CV. Various components of the lighting portions 330A"-330F" may be understood in relation to the examples of FIGS. 8A, 10A and 10B, as will be described in more detail below. For example, each of the lighting portions 330A"-330F" may include one or more mirror portions and/or one or more lens portions (e.g., as part of an imaging lens portion) for directing light toward the central volume CV. The light directed toward the central volume CV by each of the imaging lens portions of the lighting portions 330A"-330F" is configured to overlap and to form a nominally uniform intensity of illumination within at least part of the central volume CV, such that the intensity of the illumination within the central volume CV is configured to be nominally the same at a plurality of focus positions. The tops of the lighting portions in the illustration of FIG. 7 are each noted to illustrate a portion of a light guide, as providing light through a homogenizer, as will be described in more detail below with respect to FIG. 8A.

As noted above, it is generally desirable within the central volume CV to have uniform illumination in both the X and Y axis directions, as well as the Z-axis direction (e.g., to best enable/support points-from-focus type processes or similar processes, for which focus positions/Z-heights may be determined in accordance with maximum contrast determinations, etc., as described above with respect to FIGS. 4 and 5). It is also desirable for the system to be highly efficient (e.g., due to the power limitations of the relatively short light pulses, such as 100 nanosecond light pulses, as described above with respect to FIGS. 4 and 5, and in some instances what may be a relatively low capture efficiency for light scattering off of the surfaces of the workpiece).

FIG. 8A illustrates an imaging system 300'''. In the example of FIG. 8A, a single lighting portion 330A''' is illustrated, as may be understood to be representative of one of a plurality of lighting portions of a lighting configuration (e.g., as described above with respect to FIGS. 6A, 6B and 7). As disclosed herein, in certain implementations it may be desirable to enhance brightness/illumination intensity by increasing efficiency in an optical path in a lighting portion after source light is generated and provided, such as through a light guide (e.g., as opposed to light provided by a conventional ring light, which may be regarded as having certain inefficiencies as described above).

In the example of FIG. 8A, a light guide LGD provides light through an optical homogenizer HMG to an imaging lens portion ILP, which directs light toward a central volume CV, such as will be described in more detail below with respect to FIGS. 9A-9E. Some specific implementations of optical homogenizers HMG are described in more detail below with respect to FIGS. 12A-13. The imaging lens portion ILP is shown to include a first lens LNS1, first and second reflective surfaces MIR1 and MIR2 (e.g., mirrors), and a second lens LNS2. In the imaging lens portion ILP, the lenses LNS1 and LNS2 are in a telecentric arrangement (e.g., as will be described in more detail below with respect to FIG. 10B). In various implementations, the light guide LGD may be a light carrying fiber (e.g., carrying light from a light source LS).

In various implementations, the light guide LGD (e.g., a fiber light guide) enables a separation of certain electronic components (e.g., a light source LS) from the area in which the light is directed toward the workpiece. This enables a reduction in size of the lighting configuration in the area where the light is to be directed toward the workpiece for imaging, and for which the configuration at that location may also be sensitive to certain factors (e.g., heat generation, such as by a light source LS, for which it may also be advantageous to have the light source LS be located separately, such as with the light provided through the light guide LGD to the lighting configuration).

In various implementations, the light guide LGD may comprise one or more fibers (e.g., as part of a fiber bundle, such as with a few hundred fibers), or a single liquid filled light guide, etc. In one implementation, a fiber bundle (e.g., with a few hundred fibers) may receive light from a single light source, and then groups of the fibers from the fiber bundle may serve as the light guides LGD for the lighting portions. It will be appreciated that the utilization of fewer light sources (e.g., a single light source) for providing the illumination through the light guides LGD to the lighting portions may reduce the overall cost of the system (e.g., for which in some instances light sources may be of relatively high cost).

In relation to such principles, while the utilization of light guides may be associated with certain advantages, in certain implementations the light provided through the light guides may inherently not have a desired level of uniformity. Utilization of the homogenizer HMG as described herein helps address such issues, and the imaging by the imaging lens portion (e.g., with a telecentric arrangement) helps maintain the uniform intensity of the illumination. In certain implementations, the function of the homogenizer may be characterized as improving the uniformity of the cross-sectional intensity distribution without changing the angular distribution of the light.

Figure 8B:
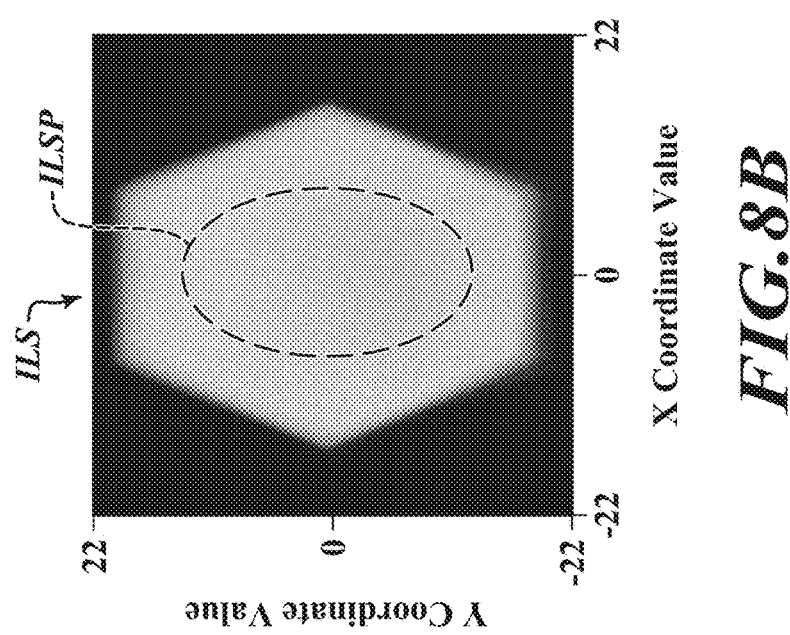
FIGS. 8A and 8B are diagrams of an exemplary implementation of a lighting portion and an illumination spot formed thereby.
Figure 8A:
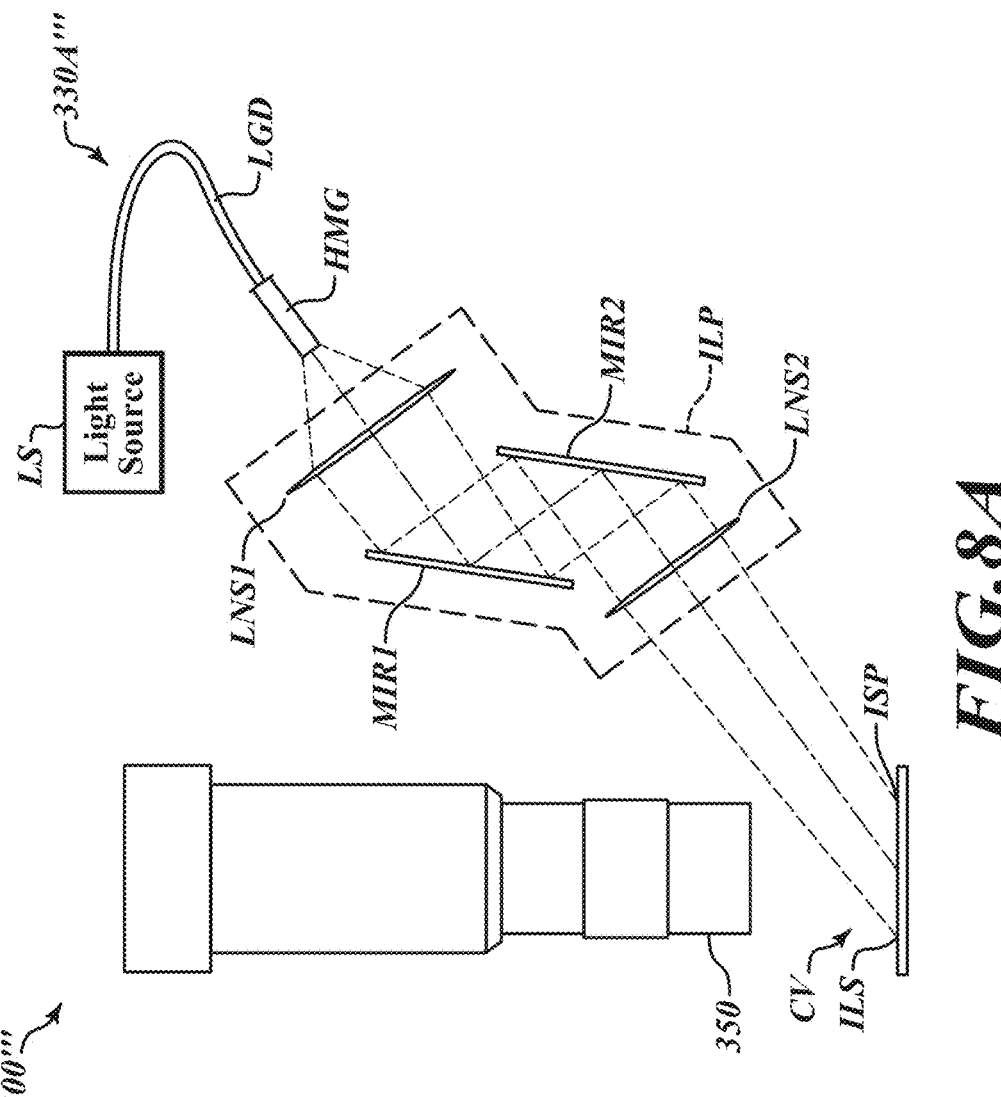
Figure 9E:
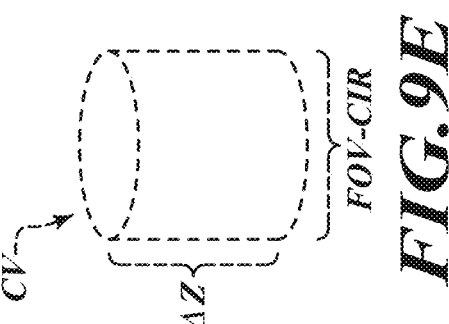
FIGS. 9A-9E are diagrams illustrating various principles for illumination from lighting portions as directed to a central volume.
Figure 9C:
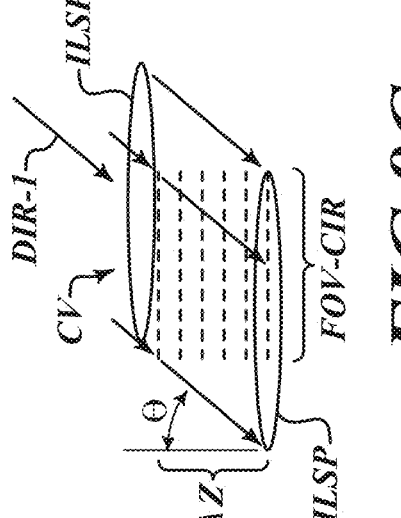
Figure 9D:
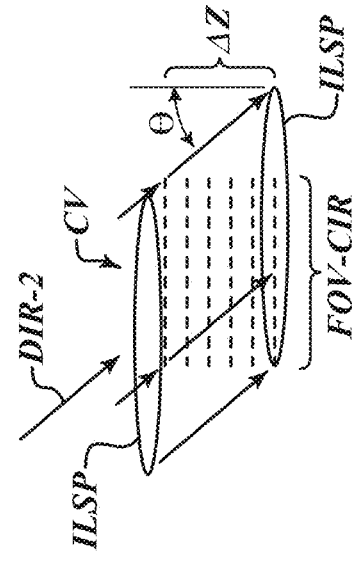

FIG. 8B illustrates an illumination spot ILS as created/formed by the configuration of FIG. 8A in an illumination spot plane ISP, with an illumination spot portion ILSP in the middle as indicated by a dotted line, for which a nominally uniform illumination may be formed within the illumination spot portion ILSP. In the illustrated example, incoherent irradiance is represented with different shading, for which uniform illumination in particular is illustrated as being produced within the illumination spot portion ILSP. As described herein, uniform illumination may be important for various types of processes (e.g., points-from-focus type processes for determining three dimensional positions of surface points on a workpiece, etc.)

As noted above, it is generally desirable for the illumination to be nominally uniform across the X, Y and Z axis directions (e.g., within the central volume CV for illuminating the workpiece). It will be appreciated that the aspect of uniform illumination in the Z-axis direction in particular has not typically been addressed in prior systems, and is related to the focus range $\Delta z$, as may be part of or otherwise correspond to the focus range Refp (e.g., in accordance with the operation of the VFL lens 370) as part of the points-from-focus type operations (e.g., for determining three-dimensional positions of surface points based at least in part on contrast calculations in relation to images in an image stack, etc.). As stated above, it is also desirable for the illumination system to have high optical efficiency. In accordance with principles disclosed herein, the light guide LGD is imaged by an imaging lens portion ILP (e.g., utilizing a telecentric arrangement) resulting in a highly efficient intensity distribution (e.g., which may be characterized as having a top-hat type intensity distribution, which has an intensity profile which is nominally flat over the desired coverage area, as will be described in more detail below with respect to FIGS. 9A-9E).

Figure 9A:
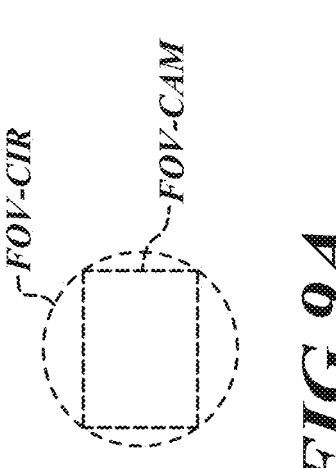
Figure 9B:
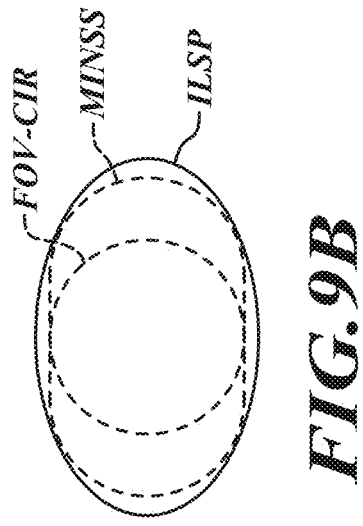
Figures 10A, 10B:
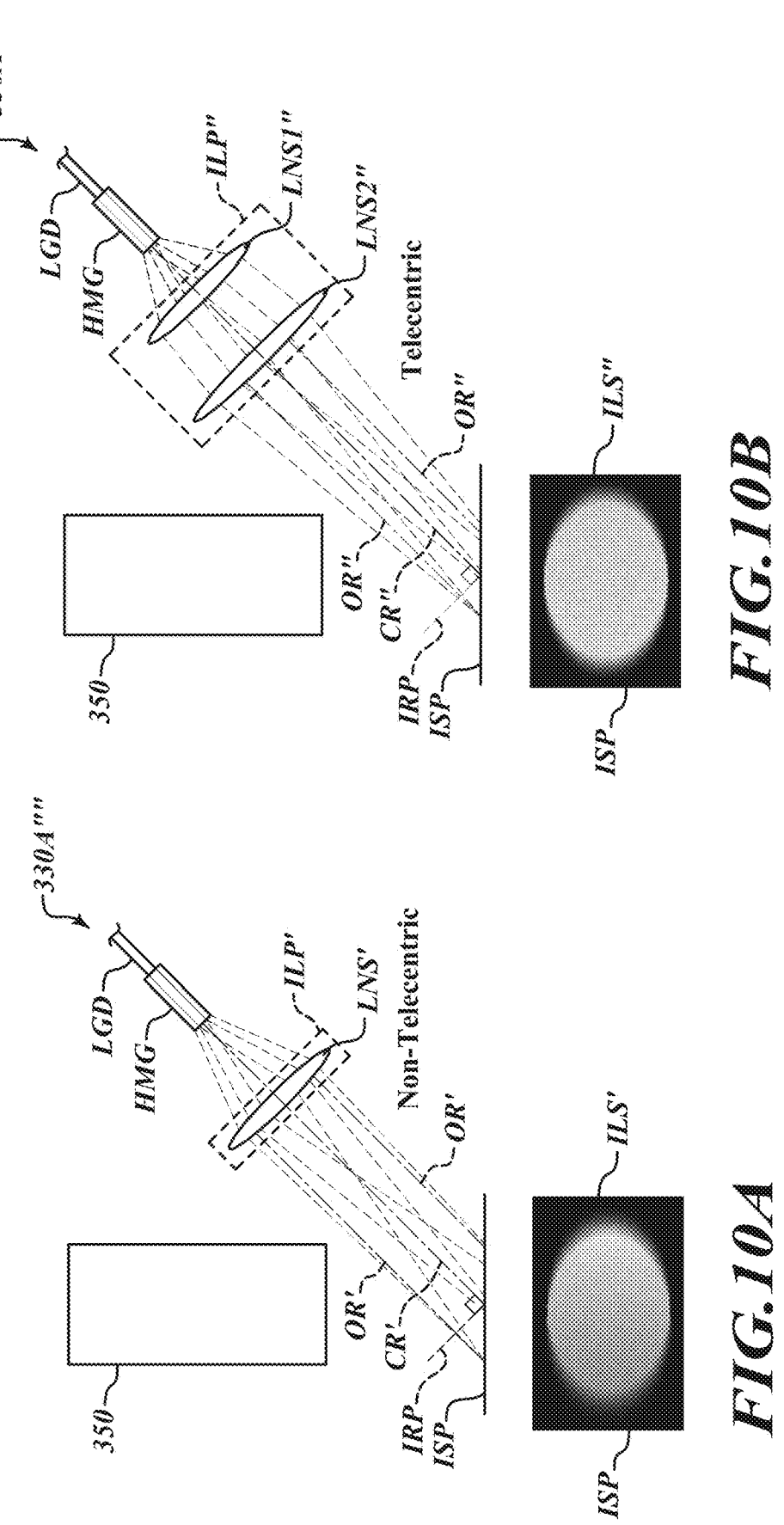
FIGS. 10A and 10B are diagrams illustrating exemplary implementations of lighting portions including non-telecentric and telecentric arrangements, respectively.

FIG. 9A illustrates a camera field of view FOV-CAM at a single working distance. FIG. 9B illustrates desirable illumination spot dimensions at the nominal working distance. It is noted that the shape of the illumination spot portion ILSP as illustrated in FIG. 9B, as well as the minimum spot size MINSS are well matched to a projected circle as imaged off-axis (e.g., with an elliptical cross-section). FIGS. 9C and 9D illustrate field of view characteristics within a volume (e.g., within a cylindrical volume of the central volume CV).

In relation to FIGS. 9A-9E, it is desirable for the illumination spot portion ILSP to be of sufficient dimensions and size, including at least a minimum spot size MINSS, so that when the light is directed from any of the angles of the lighting portions toward the central volume CV, the light will at least cover a common circular field of view FOV-CIR, at all focus positions within a focus range (e.g., $\Delta z$).

The central volume CV may include at least a cylindrical volume (e.g., with a height defined by the $\Delta z$ dimension and for which the parallel circular bases each correspond to the area of the circular field of view FOV-CIR).

In FIG. 9A, a camera field of view FOV-CAM is illustrated in accordance with a rectangular area in a first orientation (e.g., as corresponding to a rectangular pixel array and/or other rectangular sensor area of a camera). It will be appreciated that the camera field of view FOV-CAM may be made to rotate in some implementations (e.g., by rotating the camera, etc.), for which it may be desirable to define a circular field of view FOV-CIR which accommodates all possible orientations of the camera field of view FOV-CAM, as rotated through 360 degrees (e.g., around the optical axis OA).

In FIG. 9B, an illumination spot portion ISLP is illustrated as having been formed by a first lighting portion directing light in a first direction toward the central volume CV. In order to illustrate a comparative size, the circular field of view FOV-CIR is illustrated at the center of the illumination spot portion ILSP. Also illustrated is a minimum spot size MINSS, as might be employed to produce illumination for covering the size of the circular field of view FOV-CIR, at each focus position within a focus range $\Delta z$, as will be described in more detail below with respect to FIGS. 9C and 9D.

FIG. 9C is a diagram illustrating light directed in a first direction DIR-1 toward a central volume CV by a first lighting portion (e.g., lighting portion 330A of FIGS. 6A and 6B, such as with DIR-1 corresponding to DIR-A). As illustrated, in order for the illumination spot portion ILSP to cover the circular field of view FOV-CIR at each focus position within the focus range $\Delta z$ (e.g., with the circular field of view FOV-CIR illustrated at certain focus positions by dotted-lines), the illumination spot portion ILSP may be elongated (e.g., in a shape of an ellipse). As illustrated, the illumination spot portion ILSP is of sufficient dimensions such that it covers the circular field of view FOV-CIR within a cylindrical volume of the central volume CV, at each focus position within the focus range $\Delta z$.

FIG. 9D illustrates similar principles for light directed by a second lighting portion (e.g., lighting portion 330E of FIGS. 6A and 6B, such as with DIR-2 corresponding to DIR-B). For the light directed in the direction DIR-2, the illumination spot portion ILSP is illustrated as being of sufficient dimensions, such that it covers the circular field of view FOV-CIR within a cylindrical volume of the central volume CV, at each focus position within the focus range $\Delta z$.

FIG. 9E illustrates the cylindrical volume of the central volume CV. As illustrated, the cylindrical volume has a height corresponding to the dimension $\Delta z$, and for which the parallel circular bases of the cylindrical volume each correspond to the area of the circular field of view FOV-CIR. In accordance with principles as described herein, the illumination within the cylindrical volume/central volume CV may be nominally uniform, in both the X and Y axis directions, as well as the Z axis direction (e.g., as may be beneficial for applications such as points-from-focus processes, etc.)

More specifically, as described herein, the light directed toward the central volume CV by the imaging lens portions of the lighting portions may be configured to overlap and to form a nominally uniform intensity of illumination within at least part of the central volume CV, such that the intensity of the illumination within the central volume CV is configured to be nominally the same at a plurality of focus positions (e.g., with the circular field of view FOV-CIR illustrated at certain focus positions by dotted-lines in FIGS. 9C and 9D). In various implementations, each image of an image stack may correspond to one of the focus positions of the plurality of focus positions.

Within the cylindrical volume of the central volume CV, it will be appreciated that the uniformity of the illumination, both in the X and Y axis directions, as well as in the Z axis direction, provides certain advantages. In particular, as described above with respect to FIGS. 4 and 5, for points-from-focus type operations (e.g., as performed utilizing the VFL lens 370, which may be a high-speed TAG lens, etc.), the determinations/measurements of the three-dimensional positions of surface points are made based at least in part on contrast determinations. As a generalization, it may be noted that when surface points are in a "best focus" position, they may generally have a highest contrast in an image (e.g., as compared to other images of an image stack), for which a Z-height/focus position of the surface point may be determined/measured in accordance with such determination as part of the points-from-focus process. As part of such processes, uniform illumination (i.e., in X and Y axis directions, as well as the Z axis direction) is beneficial, in that non-uniform illumination may otherwise negatively affect the contrast determinations. More specifically, determination of the contrast may be affected by non-uniform illumination (e.g., where if non-uniform illumination is utilized, then different surface points at a same Z-height may nonetheless be associated with different levels of contrast due to different levels of illumination, which may incorrectly indicate different Z-heights for the respective surface points, etc.)

Thus, it is desirable to have nominally uniform illumination throughout the central volume CV, so as to best enable accurate contrast determinations for surface points on the workpiece (e.g., as primarily indicative of the Z-height/focus position of the surface points, as opposed to also being affected by varying levels of non-uniform illumination). As also indicated by the above description in relation to FIGS. 4 and 5, in order to capture imagines in an image stack as corresponding to particular focus positions (e.g., as corresponding to Z-heights), it is desirable to provide short pulses of illumination (e.g., as provided by all of the lighting portions of the lighting configuration simultaneously) at specific phase timings (e.g., as corresponding to particular focus positions). As part of such operations, it is desirable for the light provided during the short pulses to have a high intensity (high brightness), for best illuminating the workpiece (e.g., including the workpiece surfaces that may be angled or otherwise non-orthogonal to the optical axis) for best illuminating and imaging the various types of surfaces of the workpiece. Thus, high efficiency of the system in this regard is also desirable.

FIGS. 10A and 10B illustrate implementations of lighting portions 330A''' and 330A'''', including imaging lens portions ILP' and ILP'', respectively. As will be described in more detail below, the example of FIG. 10A illustrates a non-telecentric arrangement, and the example of FIG. 10B illustrates a telecentric arrangement.

The illustrations of FIGS. 10A and 10B are noted to be in relation to lateral magnification uniformity. As noted above, in order to achieve high efficiency, the light guide LGD is imaged into the central volume CV and onto the workpiece. In relation to FIG. 10A, it is noted that non-coaxial imaging using a single lens results in a non-uniform lateral magnification within the central volume. Such non-uniform lateral magnification may equate to non-uniform illumination intensity (e.g., assuming a uniform illumination source). As illustrated in FIG. 10B, such issues may be addressed by utilizing a telecentric arrangement (e.g., including at least two lenses).

As illustrated in FIG. 10A, the lighting portion 330A''' includes a light guide LGD, a homogenizer HMG, and an imaging lens portion ILP'. The imaging lens portion ILP' includes a single lens LNS' in a non-telecentric arrangement, which results in diverging outer rays OR' (which do not travel in parallel directions) and which are not orthogonal to an illumination reference plane IRP that a center ray CR' is orthogonal to. As illustrated, the illumination spot ILS' as formed at the illumination spot plane ISP generally does not have uniform illumination and may further vary in size and uniformity at different focus positions. In accordance with such characteristics, it may be less desirable to utilize the lighting portion 330A''' for certain types of processes (e.g., for certain points-from-focus type processes, etc.)

As illustrated in FIG. 10B, the lighting portion 330A'''' includes a light guide LGD, a homogenizer HMG and an imaging lens portion ILP''. The imaging lens portion ILP'' includes a first lens LNS1'' and a second lens LNS2'', in a telecentric arrangement, which results in outer rays OR'' which travel in nominally parallel directions and which are generally orthogonal to the illumination reference plane IRP that the center ray CR'' is orthogonal to. The resulting illumination spot ILS'' has more uniform illumination at the illumination spot plane ISP, as compared to the implementation of FIG. 10A. It will be appreciated that the telecentric arrangement also results in relatively uniform illumination and size of the illumination spot at different focus positions (e.g., within a focus range corresponding to a dimension Δz as described above with respect to FIGS. 9A-9E). These characteristics result in nominally uniform illumination throughout a central volume CV, including when the illumination of the central volume CV is formed by different lighting portions with similar configurations of that of FIG. 10B as directing light toward the central volume CV from different directions. As noted above, in various implementations, each of the lighting portions (e.g., lighting portions 330A-330H of FIGS. 6A and 6B and/or lighting portions 330A''-330F'' of FIG. 7) of a lighting configuration may include components similar to those illustrated in FIG. 10B.

In relation to the potential non-uniformity of the illumination of the example of FIG. 10A, it will be appreciated that at least some improvement in the uniformity may be achieved with a configuration with illumination directed from opposing directions with opposite intensity gradients (e.g., if a configuration of FIG. 10A was utilized for each of the illuminations illustrated in FIGS. 9C and 9D, the sum of the illumination may generally be more uniform). As disclosed herein, even greater uniformity may be achieved by implementations utilizing a telecentric arrangement (e.g., as illustrated in FIG. 10B) for which the illumination and corresponding illumination spot provided by each lighting portion may generally be relatively uniform (e.g., without significant intensity gradients within the illumination and resulting illumination spots, etc.). Such uniform illumination within each individual illumination spot/illumination provided by each lighting portion is also beneficial when an imaged portion of a workpiece may only receive illumination from certain lighting portions. For example, for a workpiece surface that is angled such that it is facing toward one or more of the lighting portions but is facing away from others, at least the illumination that is incident on that portion of the workpiece will be nominally uniform.

In relation to the telecentric arrangement of FIG. 10B as applied to the examples of FIGS. 9C and 9D, it will be appreciated that the direction/axis of the light from the arrangement (e.g., the directions DIR-1 and DIR-2) are "off-axis" and non-parallel relative to the optical axis OA of the objective lens 350 and the imaging system (e.g., as opposed to systems utilizing telecentric arrangements as part of imaging portions for which such telecentric arrangements are typically on-axis). In relation to the example of FIGS. 10A and 10B, it will be appreciated that even if the source light (e.g., as provided with or without a homogenizer HMG) is relatively uniform, the telecentric arrangement of FIG. 10B helps maintain the uniformity (e.g., as opposed to the diverging beam portions of some configuration such as illustrated in the example of FIG. 10A).

As noted above, it is desirable to have relatively uniform illumination provided to the central volume CV (e.g., with a top-hat type illumination spot with a relatively flat intensity profile over the desired area), for which it may be desirable for the source light (e.g., as provided by the light guide LGD) to have a fixed size and a top-hat like spatial intensity. Certain systems may have various levels of complexity in relationship to such requirements, such as a practical need to use light guides of different diameters (e.g., diameters of three millimeters, five millimeters, etc.), and for which various types of light guides (e.g., a fiber bundle guide, a liquid guide with a gaussian-like profile, etc.) may not have a desired top-hat source shape. In various implementations, in order to address such issues, a numerical aperture (NA) preserving homogenizer HMG is included between the light guide LGD and the imaging lens portion ILP, as described above. In various implementations, the homogenizer HMG may be a homogenizing rod and may include a transparent material utilizing total internal reflection (TIR) optics, or hollow reflective pieces, etc.

Figures 11A, 11B, 12A, 12B, 12C, 12D:
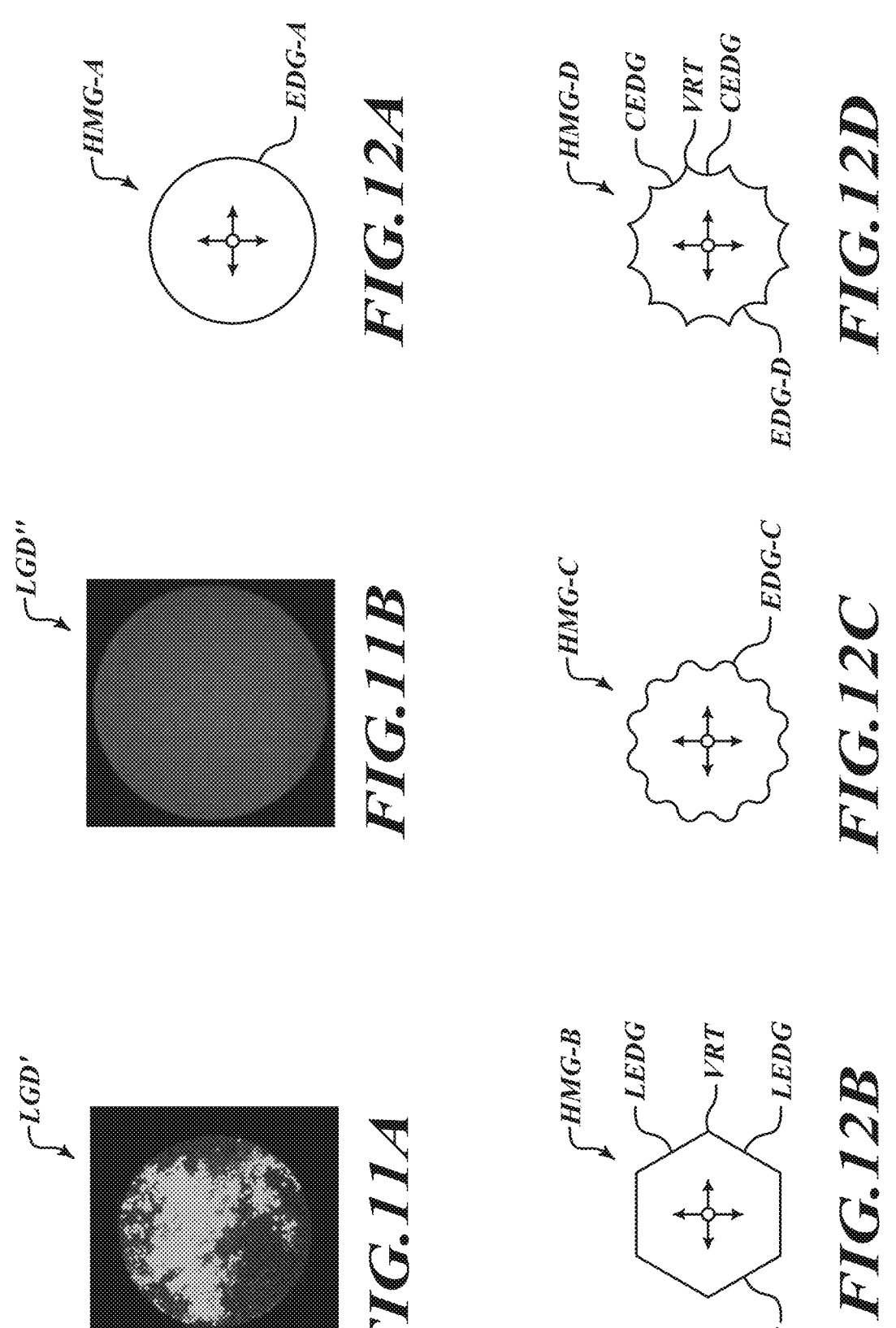
FIGS. 11A and 11B are diagrams of end views of light provided by light guides.
FIGS. 12A-12D are diagrams illustrating cross sections of various implementations of homogenizers.

FIG. 11A is an end view of a fiber light guide LGD' and FIG. 11B is an end view of a liquid light guide LGD''. Each of the light guides may provide light to a homogenizer HMG (e.g., as illustrated in FIGS. 10A and 10B). In various implementations, it may be desirable for the intensity distribution from a light guide LGD (e.g., the fiber light guide LGD' or the liquid light guide LGD'') to be smoothed or otherwise made more uniform, for which a homogenizer HMG may be utilized, as will be described in more detail below.

In general, a homogenizer HMG may be utilized to help remove spatial non-uniformity from the light from a light guide LGD. The light from the fiber light guide LGD' of FIG. 11A may in certain instances have a lower than desired level of spatial uniformity. The light from the liquid light guide LGD'' of FIG. 11B may have a level of spatial uniformity that is higher, but for which the spatial uniformity may still not be sufficient for certain applications, and for which utilization of a liquid light guide may add additional cost to a system relative to utilization of a fiber light guide. Utilization of the homogenizer HMG effectively allows the configuration to be relatively independent of the type of light guide LGD that is utilized (e.g., the fiber light guide of FIG. 11A, or the liquid light guide of FIG. 11B, etc.), by producing sufficient spatial uniformity of the light regardless of the type of light guide that is utilized.

In general, it may be desirable for the length of the homogenizer to be relatively short (e.g., as short as possible) in order to reduce the cost and overall size of the system. As will be described in more detail below with respect to FIGS. 12A-12D, utilization of certain different cross-sectional shapes may enable the length of the homogenizer to be reduced (e.g., resulting in a configuration with high efficiency). In each of the examples of FIGS. 12A-12D, the cross-sectional shape of the homogenizer does not change along the length of the homogenizer. In general, the illustrated homogenizers may be reflective homogenizers, although it will be appreciated that in other implementations other configurations may be utilized. In relation to reflective homogenizers, in various implementations complex shapes (e.g., as illustrated in FIG. 12D) may be produced by computer numerical control (CNC) methods. In addition, reflective homogenizers may benefit from shorter lengths, as a numerical aperture (NA) is not reduced by entering an optical medium (e.g., glass, etc.).

In relation to the examples of FIGS. 12A-12D, the following description indicates how the cross-sectional shape of each homogenizer HMG-A to HMG-D may affect the homogenizer performance. In one model, the transverse spreading of a point source (e.g., at a center of the cross-section of each homogenizer) with gaussian-like angular distribution may be considered.

In relation to FIG. 12A, for the round homogenizer HMG-A with a circular cross-section, the round light guide may be considered as acting as a lens in the transverse direction. This results in an oscillation of the uniformity versus the length of the homogenizer, which may generally be considered less-desirable for certain implementations (i.e., in not resulting in uniform light distribution).

As illustrated in FIG. 12B, the homogenizer HMG-B has a cross-section with a hexagon shape (e.g., such as may have been utilized for forming the illumination spot ILS of FIG. 8B), with an illustrated edge EDG-B, which includes linear edge portions LEDG (e.g., two examples of which are labeled in FIG. 12B) which meet at vertices VRT. In this configuration, the planar reflections on the hexagon may be considered as making the configuration equivalent to a hexagonal array of point sources (e.g., with no reflectors), for which as the light of each point source expands and overlaps, the uniformity improves. In configurations utilizing a homogenizer with a polygon-shaped cross-section, the configuration of the homogenizer HMG-B with the hexagon cross-section may be considered as having relatively desirable characteristics.

As illustrated in FIG. 12C, the homogenizer HMG-C has a cross-section with an edge EDG-C, which may be described as a symmetric periodic edge (e.g., which in various implementations may be sinusoidal as illustrated, or triangular, etc.). In various implementations, this design may result in images of the source within the homogenizer and for which uniformity may be reached more slowly than certain alternative designs (e.g., such as that illustrated in FIG. 12D).

As illustrated in FIG. 12D, the homogenizer HMG-D includes a cross-section with an edge EDG-D, which in certain instances may be described as corresponding to a diverging periodic edge. As illustrated in FIG. 12D, the edge EDG-D includes non-linear edge portions CEDG (e.g., curved edge portions, two examples of which are labeled in FIG. 12D) which meet at vertices VRT. In certain instances, this design may be considered as having an effect that is approximately opposite of the effect of the homogenizer HMG-A of FIG. 12A (i.e., with the round shape). More specifically, in the homogenizer HMG-D, no images of the source are created within the homogenizer and uniformity is reached relatively quickly (i.e., with a relatively short length of the homogenizer HMG-D). In certain instances, the performance is regarded as increasing with larger amplitude and lower modulations (e.g., corresponding to steeper angles). Even in instances where manufacturing requirements may add radius on sharp corners, these may have much shorter radii than the diverging edges, for which only minor performance decreases may result, and for which the overall design may be relatively desirable for the production of a relatively shorter homogenizer.

Simulations have been performed to indicate various performance characteristics of the homogenizers HMG-B to HMG-D of FIGS. 12B to 12D. For the homogenizer HMG-B of FIG. 12B, simulations indicate that uniformity approaches the desired state with underdamped oscillation. In relation to the homogenizer HMG-C of FIG. 12C, simulations indicate that the uniformity approaches the desired state with overdamped oscillation. In relation to the homogenizer HMG-D of FIG. 12D, simulations indicate that the uniformity approaches the desired state with close to critically dampened oscillation for which the configuration reaches a uniform output with the shortest homogenizer length (e.g., in comparison to certain implementations of the configurations of FIGS. 12B and 12C).

Figure 13:
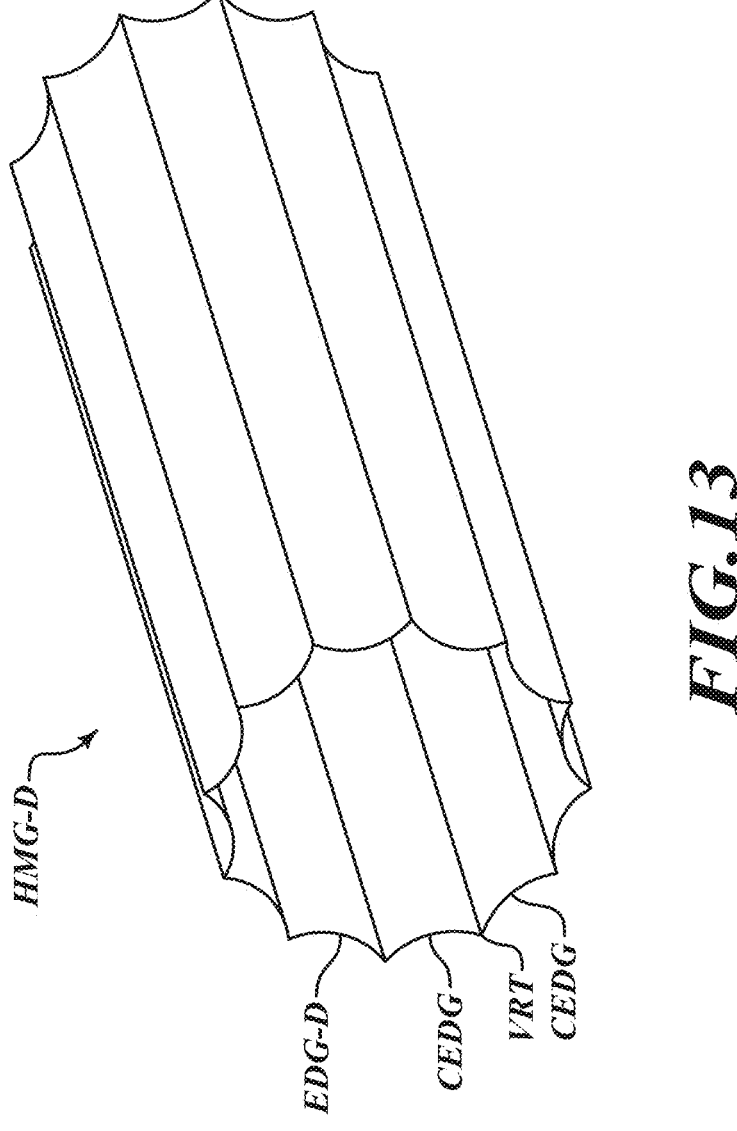
FIG. 13 is a diagram of a three dimensional view of the homogenizer of FIG. 12D.

FIG. 13 illustrates a three-dimensional view of the homogenizer HMG-D of FIG. 12D (e.g., as may be utilized in implementations such as those of FIG. 8, 10B, etc.). As described above with respect to FIG. 12D, the homogenizer HMG-D2 includes an edge EDG-D with non-linear edge portions CEDG (e.g., two examples of which are labeled in FIG. 13) which meet at vertices VRT. As described above, such a configuration may have certain desirable performance characteristics.

FIG. 14 is a flow diagram illustrating one exemplary implementation of a routine 1400 for operating a metrology system. At a block 1410, a lighting configuration is controlled to direct light toward a central volume for illuminating a workpiece (e.g., including, for each image of an image stack, providing at least one instance of pulsed illumination timed to correspond with a respective phase timing of a periodically modulated focus position that corresponds to a respective focus position for that respective image of the image stack). In various implementations, the lighting configuration comprises a plurality of lighting portions configured to illuminate the workpiece for producing image light, wherein each lighting portion comprises an imaging lens portion and the lighting portions are distributed in an arrangement in which the imaging lens portion of each lighting portion is configured to direct light toward the central volume (e.g., in which the resulting illumination within the central volume is nominally uniform). At a block 1420, a camera is utilized to acquire an image stack comprising a plurality of images of the workpiece as illuminated by the lighting configuration, wherein each image of the image stack corresponds to a different focus position along an optical axis. At a block 1430, focus curve data is determined based at least in part on an analysis of the images of the image stack, wherein the focus curve data indicates 3 dimensional positions of a plurality of surface points on the workpiece.

The following describes various exemplary embodiments of the present disclosure with various features and elements annotated with reference numerals found in FIGS. 1-14. It should be understood that the reference numerals are added to indicate exemplary embodiments, and the features and elements are not limited to the particular embodiments illustrated in FIGS. 1-14.

According to one aspect, a metrology system includes an objective lens (250, 350), a camera (260, 360), a lighting configuration (330, 330', 330"), one or more processors (125) and a memory (140). The objective lens (250, 350) is configured to input image light (255, 355) arising from a workpiece (20, 320). The objective lens is configured to transmit the image light along an imaging optical path (OPATH) and has an optical axis (OA). The camera (260, 360) is configured to receive image light transmitted along the imaging optical path and to provide images of the workpiece. A focus position (EFP) that corresponds to the focus of the images is configured to be variable within a focus range (Refp) along the optical axis. The lighting configuration (330, 330', 330") comprises a plurality of lighting portions (330A-330H, 330A"-330F") configured to illuminate the workpiece for producing the image light, wherein each lighting portion comprises an imaging lens portion (ILP, ILP', ILP") and the lighting portions are distributed in an arrangement in which the imaging lens portion of each lighting portion is configured to direct light toward a central volume (CV). The one or more processors (125) are coupled to the memory (140). The memory stores program instructions that when executed by the one or more processors cause the one or more processors to at least: control the lighting configuration to direct light toward the central volume for illuminating the workpiece; and utilize the camera to acquire an image stack comprising a plurality of images of the workpiece, wherein each image of the image stack corresponds to a different focus position along the optical axis (e.g., corresponding to a different Z-height). In various implementations, focus curve data may be determined based at least in part on an analysis of the images of the image stack. The focus curve data indicates 3 dimensional positions of a plurality of surface points on the workpiece.

In various implementations, the metrology system includes a variable focal length (VFL) lens (270, 370), wherein the objective lens transmits the workpiece light along the imaging optical path that passes through the VFL lens to the camera. The system may include a VFL lens controller (180, 380) that is configured to control the VFL lens to periodically modulate the optical power of the VFL lens over a range of optical powers at an operating frequency so as to vary the focus position of the system over a plurality of positions within the focus range. For each image of the image stack, the lighting configuration may be controlled to provide at least one instance of pulsed (e.g., strobed) illumination timed to correspond with a respective phase timing of a periodically modulated focus position that corresponds to the respective focus position for that respective image of the image stack. The VFL lens may be a tunable acoustic gradient (TAG) lens.

In various implementations, each imaging lens portion of each lighting portion may include at least two lenses (LNS1 and LNS2, LNS1" and LNS2") in a telecentric arrangement.

In various implementations, each lighting portion comprises a light guide (LGD) for which the respective imaging lens portion images at least part of the light guide to the central volume.

In various implementations, each lighting portion comprises an optical homogenizer (HMG). A cross-section of each optical homogenizer may comprise a plurality of non-linear edge portions (CEDG), which may meet at vertices (VRT).

In various implementations, the light directed toward the central volume by the imaging lens portions of the lighting portions is configured to overlap and to form a nominally uniform intensity of illumination within at least part of the central volume, such that the intensity of the illumination within the central volume is configured to be nominally the same at a plurality of focus positions. Each image of the image stack may correspond to one of the focus positions of the plurality of focus positions.

In various implementations, the arrangement in which the lighting portions are distributed is an annular arrangement, with each lighting portion located at a different angular position within the annular arrangement.

In various implementations, the plurality of lighting portions may comprise at least four lighting portions, or at least six lighting portions.

In various implementations, the arrangement in which the lighting portions are distributed is configured such that the light from each imaging lens portion is directed from a different azimuthal direction toward the central volume.

In another aspect, a method for operating a metrology system is provided. The metrology system includes an objective lens (250, 350), a camera (260, 360), and a lighting configuration (330, 330', 330"). The lighting configuration (330, 330', 330") comprises a plurality of lighting portions (330A-330H, 330A"-330F"). The method comprises controlling the lighting configuration including the plurality of lighting portions to direct light toward the central volume for illuminating the workpiece (1410), wherein each lighting portion comprises an imaging lens portion (ILP, ILP', ILP") and the lighting portions are distributed in an arrangement in which the imaging lens portion of each lighting portion is configured to direct light toward a central volume (CV); and utilizing the camera to acquire an image stack comprising a plurality of images of the workpiece, wherein each image of the image stack corresponds to a different focus position along the optical axis (1420). In various implementations, focus curve data may be determined based at least in part on an analysis of the images of the image stack (1430). The focus curve data indicates 3 dimensional positions of a plurality of surface points on the workpiece.

In various implementations, for each image of the image stack, the lighting configuration is controlled to provide at least one instance of pulsed illumination timed to correspond with a respective phase timing of a periodically modulated focus position that corresponds to the respective focus position for that respective image of the image stack.

In another aspect, a lighting configuration (330, 330', 330") for utilization in a metrology system is provided. The metrology system includes an objective lens (250, 350) and a camera (260, 360). The objective lens has an optical axis (OA) and is configured to input image light (255, 355) arising from a workpiece (20, 320) and to transmit the image light along an imaging optical path (OPATH). The camera is configured to receive image light transmitted along the imaging optical path and to provide images of the workpiece. A focus position (EFP) that corresponds to the focus of the images is configured to be variable within a focus range (Refp) along the optical axis. The lighting configuration (330, 330', 330") comprises a plurality of lighting portions (330A-330H, 330A"-330F") configured to illuminate the workpiece for producing the image light. Each lighting portion comprises an imaging lens portion (ILP, ILP', ILP") and the lighting portions are distributed in an arrangement in which the imaging lens portion of each lighting portion is configured to direct light toward a central volume (CV). The lighting configuration is controlled to direct light toward the central volume for illuminating the workpiece. The camera is utilized to acquire an image stack comprising a plurality of images of the workpiece. Each image of the image stack corresponds to a different focus position along the optical axis. In various implementations, focus curve data may be determined based at least in part on an analysis of the images of the image stack. The focus curve data indicates 3 dimensional positions of a plurality of surface points on the workpiece.

In various implementations, for each image of the image stack, the lighting configuration may be controlled to provide at least one instance of pulsed illumination timed to correspond with a respective phase timing of a periodically modulated focus position that corresponds to the respective focus position for that respective image of the image stack.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
an objective lens configured to input image light arising from a workpiece, wherein the objective lens is configured to transmit the image light along an imaging optical path and has an optical axis;
a camera configured to receive image light transmitted along the imaging optical path and to provide images of the workpiece, wherein a focus position that corresponds to the focus of the images is configured to be variable within a focus range along the optical axis;
a lighting configuration comprising a plurality of lighting portions configured to illuminate the workpiece for producing the image light, wherein:
the plurality of lighting portions comprises:
a first lighting portion comprising a first imaging lens portion, wherein the first imaging lens portion comprises at least two lenses in a first telecentric arrangement;
a second lighting portion comprising a second imaging lens portion, wherein the second imaging lens portion comprises at least two lenses in a second telecentric arrangement;
a third lighting portion comprising a third imaging lens portion, wherein the third imaging lens portion comprises at least two lenses in a third telecentric arrangement; and
a fourth lighting portion comprising a fourth imaging lens portion, wherein the fourth imaging lens portion comprises at least two lenses in a fourth telecentric arrangement;
the first, second, third and fourth lighting portions are distributed in an arrangement in which the first, second, third and fourth imaging lens portions are each configured to direct light toward a central volume for illuminating the workpiece;
one or more processors; and a memory coupled to the one or more processors and storing program instructions that when executed by the one or more processors cause the one or more processors to at least:
control the lighting configuration to direct light toward the central volume for illuminating the workpiece; and
utilize the camera to acquire an image stack comprising a plurality of images of the workpiece, wherein each image of the image stack corresponds to a different focus position along the optical axis.

2. The system of claim 1, wherein the program instructions when executed by the one or more processors further cause the one or more processors to determine focus curve data based at least in part on an analysis of the images of the image stack, wherein the focus curve data indicates 3 dimensional positions of a plurality of surface points on the workpiece.

3. The system of claim 1, further comprising a variable focal length (VFL) lens, wherein the objective lens transmits the workpiece light along the imaging optical path that passes through the VFL lens to the camera.

4. The system of claim 3, wherein the system further comprises a VFL lens controller that is configured to control the VFL lens to periodically modulate the optical power of the VFL lens over a range of optical powers at an operating frequency so as to vary the focus position of the system over a plurality of positions within the focus range.

5. The system of claim 4, wherein for each image of the image stack, the lighting configuration is controlled to provide at least one instance of pulsed illumination timed to correspond with a respective phase timing of a periodically modulated focus position that corresponds to the respective focus position for that respective image of the image stack.

6. The system of claim 4, wherein the VFL lens is a tunable acoustic gradient (TAG) lens.

7. The system of claim 1, wherein:
the first lighting portion comprises a first light guide, for which the first imaging lens portion with the at least two lenses in the first telecentric arrangement images at least part of the first light guide to the central volume;
the second lighting portion comprises a second light guide, for which the second imaging lens portion with the at least two lenses in the second telecentric arrangement images at least part of the second light guide to the central volume;
the third lighting portion comprises a third light guide, for which the third imaging lens portion with the at least two lenses in the third telecentric arrangement images at least part of the third light guide to the central volume; and
the fourth lighting portion comprises a fourth light guide, for which the fourth imaging lens portion with the at least two lenses in the fourth telecentric arrangement images at least part of the fourth light guide to the central volume.

8. The system of claim 1, wherein:
the first lighting portion comprises a first light guide and a first optical homogenizer, for which the first light guide provides light through the first optical homogenizer to the first imaging lens portion with the at least two lenses in the first telecentric arrangement;
the second lighting portion comprises a second light guide and a second optical homogenizer, for which the second light guide provides light through the second optical homogenizer to the second imaging lens portion with the at least two lenses in the second telecentric arrangement;

the third lighting portion comprises a third light guide and a third optical homogenizer, for which the third light guide provides light through the third optical homogenizer to the third imaging lens portion with the at least two lenses in the third telecentric arrangement; and the fourth lighting portion comprises a fourth light guide and a fourth optical homogenizer, for which the fourth light guide provides light through the fourth optical homogenizer to the fourth imaging lens portion with the at least two lenses in the fourth telecentric arrangement.

9. The system of claim 8, wherein a cross-section of each optical homogenizer comprises a plurality of non-linear edge portions.

10. The system of claim 9, wherein the non-linear edge portions meet at vertices.

11. The system of claim 1, wherein the light directed toward the central volume by the first, second, third and fourth imaging lens portions of the first, second, third and fourth lighting portions is configured to overlap and to form a nominally uniform intensity of illumination within at least part of the central volume, such that the intensity of the illumination within the central volume is configured to be nominally the same at a plurality of focus positions.

12. The system of claim 11, wherein each image of the image stack corresponds to one of the focus positions of the plurality of focus positions.

13. The system of claim 1, wherein the arrangement in which the lighting portions are distributed is an annular arrangement, with each lighting portion located at a different angular position within the annular arrangement.

14. The system of claim 1, wherein the plurality of lighting portions comprises at least six lighting portions.

15. The system of claim 1, wherein the arrangement in which the lighting portions are distributed is configured such that the light from each imaging lens portion is directed from a different azimuthal direction toward the central volume.

16. A method for operating a metrology system, the metrology system comprising:

an objective lens configured to input image light arising from a workpiece, wherein the objective lens is configured to transmit the image light along an imaging optical path and has an optical axis;

a camera configured to receive image light transmitted along the imaging optical path and to provide images of the workpiece, wherein a focus position that corresponds to the focus of the images is configured to be variable within a focus range along the optical axis; and a lighting configuration comprising a plurality of lighting portions;

the method comprising:

controlling the lighting configuration including the plurality of lighting portions to direct light toward a central volume for illuminating the workpiece, wherein:

the plurality of lighting portions comprises:

a first lighting portion comprising a first imaging lens portion, wherein the first imaging lens portion comprises at least two lenses in a first telecentric arrangement;

a second lighting portion comprising a second imaging lens portion, wherein the second imaging lens portion comprises at least two lenses in a second telecentric arrangement;

a third lighting portion comprising a third imaging lens portion, wherein the third imaging lens portion comprises at least two lenses in a third telecentric arrangement; and a fourth lighting portion comprising a fourth imaging lens portion, wherein the fourth imaging lens portion comprises at least two lenses in a fourth telecentric arrangement;

the first, second, third and fourth lighting portions are distributed in an arrangement in which the first, second, third and fourth imaging lens portions are each configured to direct light toward the central volume for illuminating the workpiece; and utilizing the camera to acquire an image stack comprising a plurality of images of the workpiece, wherein each image of the image stack corresponds to a different focus position along the optical axis.

17. The method of claim 16, further comprising determining focus curve data based at least in part on an analysis of the images of the image stack, wherein the focus curve data indicates 3 dimensional positions of a plurality of surface points on the workpiece.

18. The method of claim 16, wherein for each image of the image stack, the lighting configuration is controlled to provide at least one instance of pulsed illumination timed to correspond with a respective phase timing of a periodically modulated focus position that corresponds to the respective focus position for that respective image of the image stack.

19. A lighting configuration for utilization in a metrology system, the metrology system comprising:

an objective lens configured to input image light arising from a workpiece, wherein the objective lens is configured to transmit the image light along an imaging optical path and has an optical axis;

a camera configured to receive image light transmitted along the imaging optical path and to provide images of the workpiece, wherein a focus position that corresponds to the focus of the images is configured to be variable within a focus range along the optical axis;

the lighting configuration comprising:

a plurality of lighting portions configured to illuminate the workpiece for producing the image light, wherein:

the plurality of lighting portions comprises:

a first lighting portion comprising a first imaging lens portion, wherein the first imaging lens portion comprises at least two lenses in a first telecentric arrangement;

a second lighting portion comprising a second imaging lens portion, wherein the second imaging lens portion comprises at least two lenses in a second telecentric arrangement;

a third lighting portion comprising a third imaging lens portion, wherein the third imaging lens portion comprises at least two lenses in a third telecentric arrangement; and a fourth lighting portion comprising a fourth imaging lens portion, wherein the fourth imaging lens portion comprises at least two lenses in a fourth telecentric arrangement;

the first, second, third and fourth lighting portions are distributed in an arrangement in which the first, second, third and fourth imaging lens portions are each configured to direct light toward a central volume for illuminating the workpiece; and wherein:

the lighting configuration is controlled to direct light toward the central volume for illuminating the workpiece; and the camera is utilized to acquire an image stack comprising a plurality of images of the workpiece, wherein each image of the image stack corresponds to a different focus position along the optical axis.

20. The lighting configuration of claim 19, wherein focus curve data is determined based at least in part on an analysis of the images of the image stack, wherein the focus curve data indicates 3 dimensional positions of a plurality of surface points on the workpiece.

21. The lighting configuration of claim 19, wherein for each image of the image stack, the lighting configuration is controlled to provide at least one instance of pulsed illumination timed to correspond with a respective phase timing of a periodically modulated focus position that corresponds to the respective focus position for that respective image of the image stack.

22. The system of claim 1, wherein for each lighting portion, a direction of the light from the corresponding telecentric arrangement is off-axis and non-parallel relative to the optical axis of the objective lens.

23. The system of claim 1, further comprising an optical configuration included in the imaging optical path between the objective lens and the camera, wherein the optical configuration comprises a plurality of lenses and is configured to maintain a telecentricity at the workpiece.

24. The lighting configuration of claim 19, wherein:

the first lighting portion comprises a first light guide, for which the first imaging lens portion with the at least two lenses in the first telecentric arrangement images the first light guide into the central volume and onto the workpiece;

the second lighting portion comprises a second light guide, for which the second imaging lens portion with the at least two lenses in the second telecentric arrangement images the second light guide into the central volume and onto the workpiece;

the third lighting portion comprises a third light guide, for which the third imaging lens portion with the at least two lenses in the third telecentric arrangement images the third light guide into the central volume and onto the workpiece; and the fourth lighting portion comprises a fourth light guide, for which the fourth imaging lens portion with the at least two lenses in the fourth telecentric arrangement images the fourth light guide into the central volume and onto the workpiece.

* * * * *